United States Patent [19]

Nakagawa et al.

[11] Patent Number: 4,827,345
[45] Date of Patent: May 2, 1989

[54] IMAGE READOUT APPARATUS

[75] Inventors: Katsumi Nakagawa, Kawasaka; Toshiyuki Komatsu, Yamato; Shinichi Seitoh, Isehara; Katsunori Hatanaka, Yokohama, all of Japan

[73] Assignee: Canon Kabushiki Kaisha, Tokyo, Japan

[21] Appl. No.: 73,309

[22] Filed: Jul. 13, 1987

Related U.S. Application Data

[63] Continuation of Ser. No. 753,578, Jul. 10, 1985, abandoned.

[30] Foreign Application Priority Data

| Jul. 17, 1984 | [JP] | Japan | 59-146963 |
| Jul. 17, 1984 | [JP] | Japan | 59-146964 |
| Jul. 17, 1984 | [JP] | Japan | 59-146965 |
| Jul. 17, 1984 | [JP] | Japan | 59-146966 |
| Jul. 17, 1984 | [JP] | Japan | 59-146967 |

[51] Int. Cl.[4] .............................................. H04N 3/14
[52] U.S. Cl. ................................ 358/213.27; 358/212; 358/213.31; 358/213.29
[58] Field of Search ................... 358/213.11, 213.12, 358/213.23, 213.24, 213.25, 213.26, 213.27, 213.29, 213.31, 212; 250/578

[56] References Cited

U.S. PATENT DOCUMENTS

| 4,424,590 | 1/1984 | Ozawa | 358/213 |
| 4,529,886 | 7/1985 | Yokoyama et al. | 358/212 |
| 4,575,638 | 3/1986 | Okumura | 358/213.29 |
| 4,600,843 | 7/1986 | Kizu et al. | 358/213 |

Primary Examiner—L. T. Hix
Assistant Examiner—David M. Gray
Attorney, Agent, or Firm—Fitzpatrick, Cella, Harper & Scinto

[57] ABSTRACT

An image readout apparatus includes a plurality of photoelectric conversion elements, storage devices provided for each of the photoelectric conversion elements for storing each output signal from the photoelectric conversion elements, and discharge switches provided each in parallel with each of the storage devices. In the image readout apparatus, the photoelectric conversion elements and discharge switches are respectively divided into a predetermined number of blocks and the signal transference is performed collectively for each block, thus enabling a high-speed and reliable operation.

7 Claims, 22 Drawing Sheets (a) T1~T3
(b) T4~T6
(c) T7~T9
(d) T10
(e) T11
(f) T12
(g) CT1~CT3

| Fig. 9A | Fig. 9B |

| Fig. 11A | Fig. 11 B |

| Fig.15A | Fig.15B |

IMAGE READOUT APPARATUS

This application is a continuation of application Ser. No. 753,578, filed July 10, 1985, now abandoned.

BACKGROUND OF THE INVENTION

1. Field of the Invention

The present invention relates to an image readout apparatus, and more particularly, to an image readout apparatus having a means for storing incident light information. The present invention is applicable to an image readout unit of such as a facsimile apparatus.

2. Description of the Prior Art

A circuit diagram of a prior art image readout apparatus is shown in FIG. 1, in which a light sensor array including nine light sensors is illustratively shown as one example of such image readout apparatuses.

In the figure, three out of nine light sensors E1 to E9 constitute one block, while three blocks constitute a light sensor array. Such is also the case with capacitors C1 to C9 and switching transistors T1 to T9, each corresponding to the respective light sensors E1 to E9 (a common electrode). One electrode of each light sensor E1 to E9 is connected to a power source 101, while the other common electrode consisting of separate electrodes connected via the respective capacitors C1 to C9 is connected to ground.

Among these separate electrodes, the electrodes having the same order in position in respective blocks are connected to one of common lines 102 to 104 via the corresponding switching transistors T1 to T9. Particularly, the first switching transistors T1, T4 and T7 of the respective blocks are connected to the common line 102, the second switching transistors T2, T5 and T8 to the common line 103, and the third switching transistors T3, T6 and T9 to the common line 104. The common lines 102 to 104 are connected to an amplifier 105 via respective switching transistors T10 to T12.

The gate electrodes of the switching transistors T10 to T9 are connected in common collectively for each block, and the commonly connected gate electrodes are connected to a corresponding parallel output terminal of a shift register 106. High level outputs are sequentially delivered from the respective parallel output terminals of the shift register 106, so that the switching transistors T1 to T9 are sequentially rendered conductive collectively for each block.

Each gate electrode of the respective switching transistors T10 to T12 is connected to a corresponding parallel output terminal of a shift register 107. High level outputs are sequentially delivered from the parallel output terminals of the shift register 107, so that the switching transistors T10 to T12 are sequentially rendered conductive at determined timings. The electrodes connected in common of the switching transistors T10 to T12 are grounded via a discharge switching transistor T13. The gate electrode of the switching transistor T13 is connected to a terminal 108.

The operation of the prior art image readout apparatus constructed as above will be explained briefly.

When the light sensors E1 to E9 receive light, the capacitors C1 to C9 store electric charges in accordance with amount of light intensity, respectively. Thereafter, high level outputs from the shift registers 106 and 107 are sequentially delivered at respective determined timings. It is assumed now that high level outputs are delivered from the first parallel output terminals of both registers 106 and 107. Then, the switching transistor T10, connected to the first block switching transistors T1 to T3 via the common line 102, is turned on and the electric charge stored in the capacitor C1 is transferred, via the switching transistor T1, common line 102 and switching transistor T10, to the amplifier 105, thereby outputting the electric charge as image information.

After the electric charge stored in the capacitor C1 is read out, a high level external output is applied to the terminal 108 and the switching transistor T13 is turned on. As a result, the residual electric charge in the capacitor C1 is fully discharged by way of the switching transistor T1, common line 102, switching transistor T10 and hence switching transistor T13.

Succeedingly, by retaining the first parallel output from the shift register 106 at a high level, the parallel outputs from the shift register 107 are sequentially applied to the switching transistors T11 and T12 to turn on the transistors T11 and T12. By doing so, the readout and discharge operations as above are conducted with respect to the capacitors C2 and C3 to thereby sequentially read out the information stored in these capacitors.

After completion of the readout of information from the first block, the shift register 106 is sequentially shifted to conduct the readout of information from the second and third blocks in the similar way as described above. Consequently, the information stored in the capacitors C1 to C9 is read out serially and outputted from the amplifier 105 as image information.

Since the prior art image readout apparatus shown in FIG. 1 has capacitors for storing electric charges, a large output signal can be obtained. Furthermore, it is advantageous in that if the light sensors E1 to E9, capacitors C1 to C9 and switching transistors T1 to T9 are implemented on single substrate made of a thin-film semiconductor, the number of connection points for external circuits can be reduced.

In this connection, however, the thin-film transistor (TFT) has a property that its on-state resistance is high. Therefore, the thin-film transistor is associated with some drawbacks that time constants determined by the capacitances of the capacitors C1 to C9 and the resistances of the corresponding switching transistors T1 to T9 become longer, and that discharge times of the capacitors C1 to C9 also become longer due to the distributed capacitances and resistances of the common lines 102 to 104 and of the switching transistors T10 to T13. Furthermore, there is a problem that the prior art image readout apparatus cannot be operated at a high speed because each of the capacitors C1 to C9 requires a discharge operation after each time it is used in the readout operation.

SUMMARY OF THE INVENTION

The present invention has been made in view of the above prior art problems. It is therefore an object of the present invention to provide an image readout apparatus which can be operated at a high speed and has little connections necessary for access to external circuits.

It is another object of the present invention to provide an image readout apparatus wherein discharge switching transistors are provided in parallel with electric charge storing capacitors which store the signals outputted from photoelectric conversion elements.

According to one aspect of the present invention, there is provided an image readout apparatus wherein information for each block is temporarily transferred to other capacitors, the information is sequentially read out from the other capacitors, and thereafter residual electric charges in the capacitors are discharged for each block.

According to another aspect of the present invention, there is provided an image readout apparatus wherein light information stored in first capacitors are transferred collectively for each block to other capacitors, and after sequentially reading-out from the other capacitors, the first capacitors and the other capacitors are independently discharged.

In another aspect of the present invention to provide an image readout apparatus which comprises second capacitors capable of storing information for a plurality of blocks, discharge switching transistors connected in parallel with the respective second capacitors for operating for each block, and switching transistors for time-sequentially deriving information for each block from the respective second capacitors.

In still another aspect of the present invention, there is provided an image readout apparatus which comprises first discharge switching transistors connected in parallel with each of first capacitors of storing photoelectric charges, second capacitors capable of storing information for plurality of blocks, discharge switching transistors connected in parallel with the respective second capacitors for operating for each block, and switching transistors for time-sequentially deriving information for each block form the respective second capacitors.

DETAILED DESCRIPTION OF THE PREFERRED EMBODIMENTS

The embodiments of the present invention will now be described in detail with reference to the accompanying drawings.

In the following embodiments, the arrangements of light sensors E1 to E9, capacitors C1 to C9, switching transistors T1 to T12 and shift registers 106 and 107 and like others are identical to those in the prior art shown in FIG. 1, therefore the description therefor is omitted.

Figure 2:
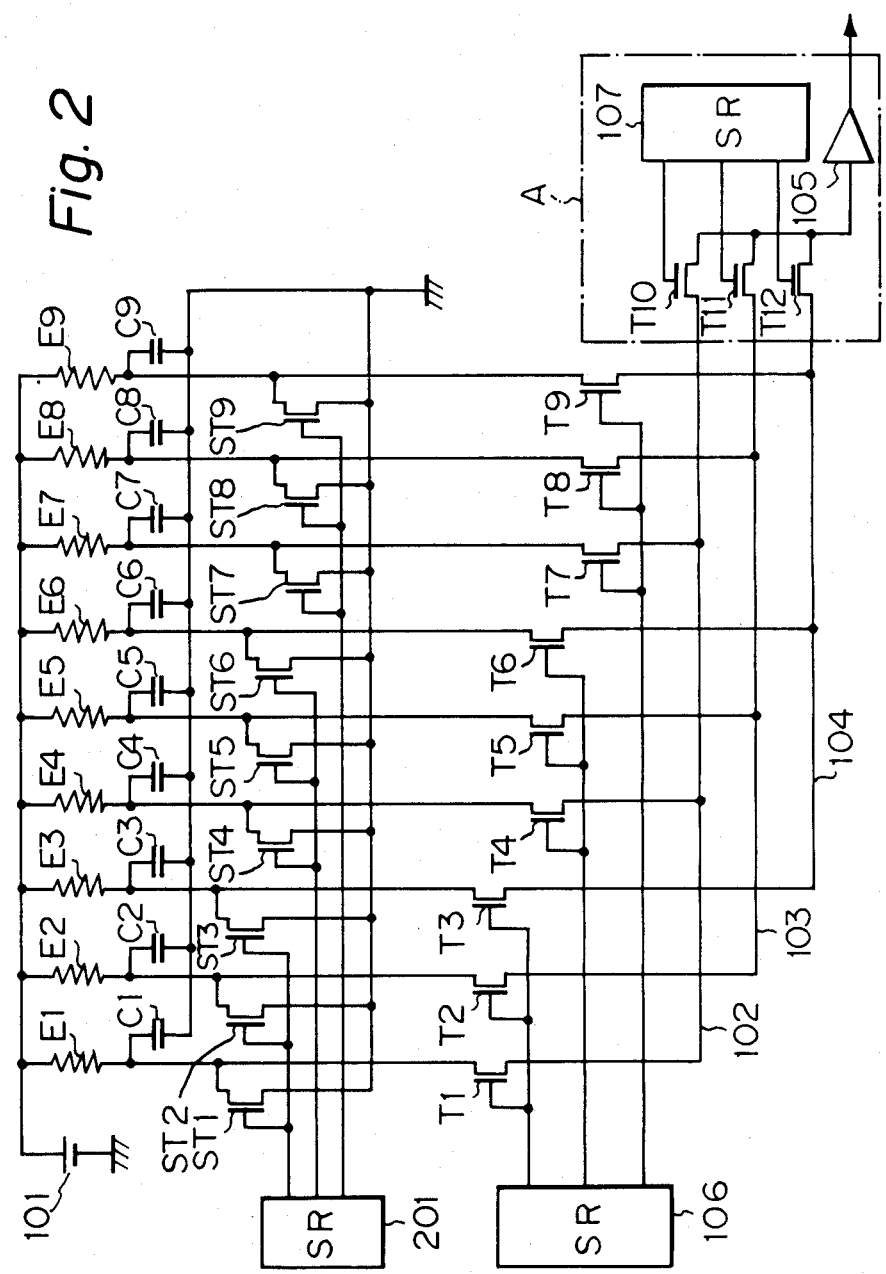
FIG. 2 is a circuit diagram of an image readout apparatus according to a first embodiment of the present invention.

In FIG. 2, the separate electrodes of the light sensors E1 to E9 are grounded via respective switching transistors ST1 to ST9. Specifically, each of the switching transistors ST1 to ST9 is correspondingly connected in parallel relation to each of the capacitors C1 to C9.

Similarly to the gate electrodes of the switching transistors T1 to T9, the gate electrodes of the switching transistors ST1 to ST9 are connected in common collectively for each block and the commonly connected gate electrodes for each block are connected to the corresponding parallel output terminal of a shift register 201. Therefore, the switching transistors ST1 to ST9 for each block are rendered conductive at the shift timings of the shift register 201.

Next, the operation of this embodiment constructed as above will be explained in relation to the timing charts of the switching transistors T1 to T12 and ST1 to ST9 shown in FIG. 3.

First, as the light sensors E1 to E9 receive light rays, electric charges corresponding in amount to the light intensity are stored in the capacitors C1 to C9 from the power source 101. Then, a high level output is delivered from the first parallel output terminal of the shift register 106 to render the switching transistors T1 to T3 conductive [chart (a) of FIG. 3].

Figure 3:
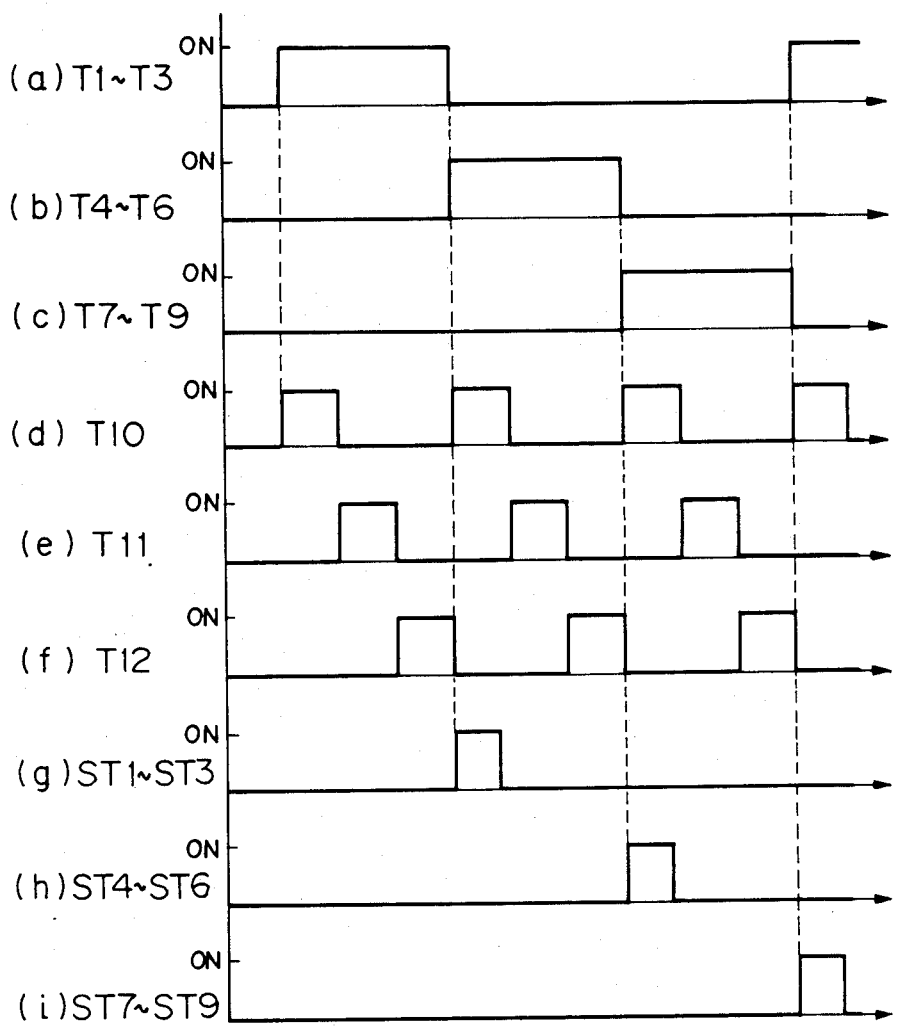
FIG. 3 shows a timing chart for explaining the operation of the first embodiment.

While the switching transistors T1 to T3 are conductive, the shift register 107 shifts to sequentially render the switching transistors T10 to T12 conductive [charts (d) to (f) of FIG. 3]. That is, the light information stored in the first block capacitors C1 to C3 is sequentially read out.

After the information with respect to the last capacitor C3 of the first block is read out, the shift register 106 shifts again to deliver a high level output from the second parallel output terminal, thereby making the switching transistors T4 to T6 conductive [chart (b) of FIG. 3].

At the same time, a high level output from the first parallel output terminal of the shift register 201 is delivered to make the switching transistors ST1 to ST3 conductive, thereby fully discharging the residual electric charges in the capacitors C1 to C3 [chart (g) of FIG. 3].

Along with the discharge of the capacitors C1 to C3, during the time when the switching transistors T4 to T6 are being conductive, upon shifting of the shift register 107 the switching transistors T10 to T12 are sequentially made conductive. Thus, the light information stored in the second block capacitors C4 to C6 is sequentially read out [charts (d) to (f) of FIG. 3].

Thereafter, along with the readout of the third block [chart (c) of FIG. 3], the discharge of the second block capacitors C4 to C6 is performed [chart (h) of FIG. 3]. Similar operations described above are repeated for each block.

As appreciated from the above, simultaneously with the readout of one block, the capacitors of the preceding block of which the readout is already finished can be discharged, thereby enabling to reduce the overall operation time.

Figure 4:
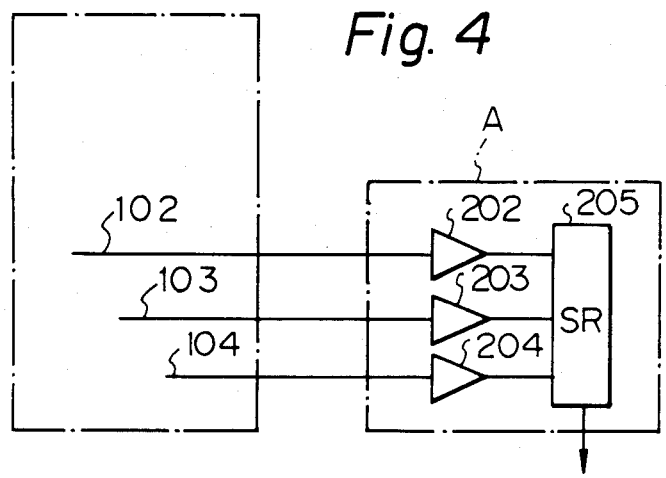
FIG. 4 is a circuit diagram of an image readout apparatus according to a second embodiment of the present invention, wherein part of the circuit is omitted.

FIG. 4 shows a second embodiment of the present invention, wherein only the portion A is different from the corresponding portion A of the first embodiment of FIG. 2.

In the second embodiment, amplifiers 202 to 204 are respectively connected to the common lines 102 to 104. The output of the amplifiers 202 to 204 are coupled to the respective parallel input terminals of a shift register 205. Image information is outputted from the serial output terminal of the shift register 205 in the form of serial data.

With this arrangement, one block information is simultaneously inputted to the shift register 205, and thereafter as the shift register 205 shifts, the serial image information is outputted.

Also in this embodiment, after one block information is outputted from the shift register 205, the discharge of the corresponding capacitors together with the readout of the next block capacitors is simultaneously carried out.

The switching transistors ST1 to ST9, as in the case of the switching transistors T1 to T9, may be fabricated using thin-film transistors. At that time, the thin-film transistors may be fabricated on the same substrate together with the other circuit elements.

Even if the thin-film transistors are used for the switching transistors ST1 to ST9, the simultaneous operation of the discharge of one block capacitors and the readout of the next block capacitors enables to shorten the overall readout time as compared with the prior art.

Figure 5:
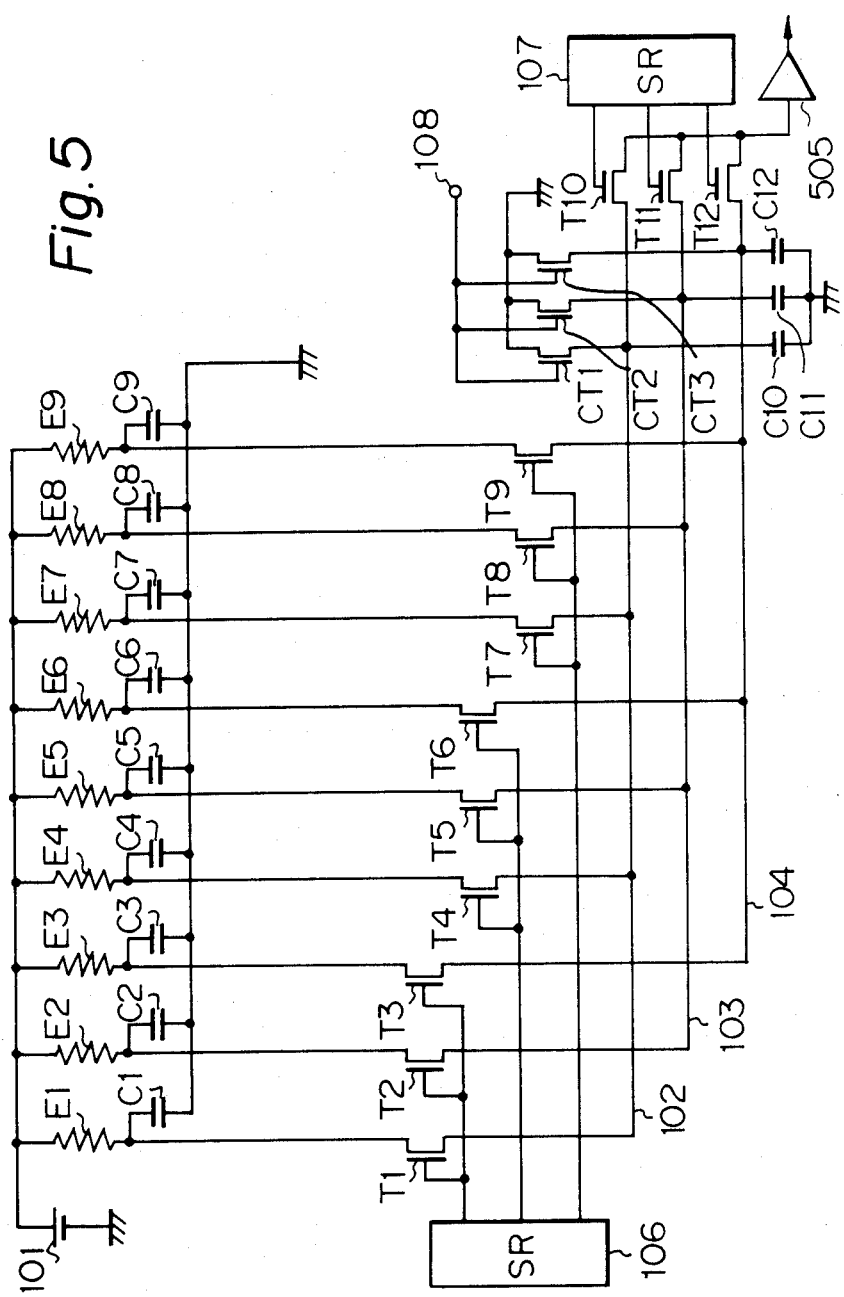
FIG. 5 is a circuit diagram of an image readout apparatus according to a third embodiment of the present invention.

FIG. 5 is a circuit diagram illustrating a third embodiment of the image readout apparatus according to the present invention.

Figure 1:
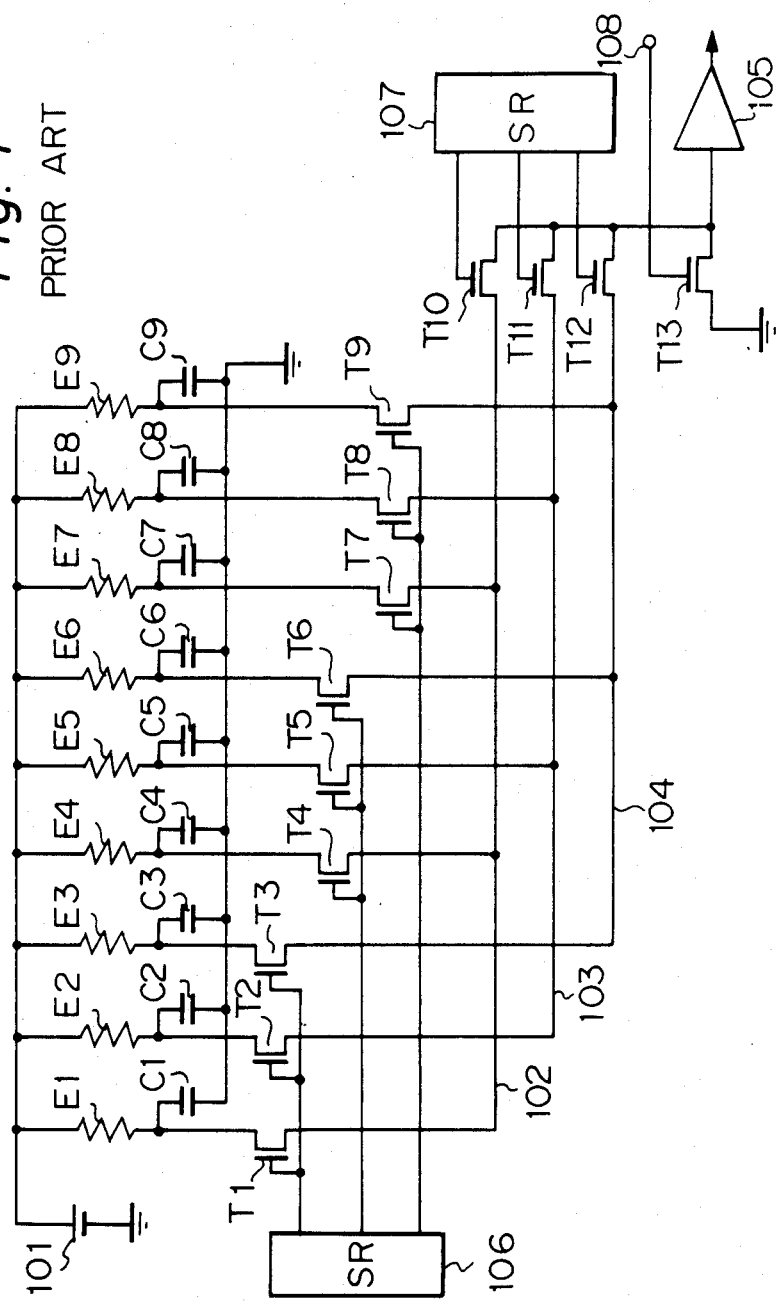
FIG. 1 is a circuit diagram of one of the conventional image readout apparatuses.

In this embodiment, the arrangements of light sensors E1 to E9, capacitors C1 to C9, switching transistors T1 to T12 and shift registers 106 and 107 and like others are identical to those in the prior art shown in FIG. 1, therefore the description therefor is omitted.

In FIG. 5, the common lines 102 to 104 are grounded via respective capacitors C10 to C12 and also grounded via switching transistors CT1 to CT3. Capacitance of each capacitor C10 to C12 is determined sufficiently larger than that of each capacitor C1 to C9.

The gate electrodes of the switching transistors CT1 to CT3 are connected in common to a terminal 108. Thus, upon application of a high level signal to the terminal 108, all of the switching transistors CT1 to CT3 are made conductive at the same time and the common lines 102 to 104 are grounded.

The operation of this embodiment constructed as above will be explained in relation to the timing chart of the switching transistors T1 to T12 and CT1 to CT3 shown in FIG. 6. In the timing chart, an on-state timing of each switching transistor is shown. It is here noted that such on-state timing is also applicable to the high level signal outputted from the shift registers 106 and 107.

First, as the light sensors E1 to E9 receive light rays, electric charges corresponding in amount to the light intensity are stored in the capacitors C1 to C9 from the power source 101.

Figure 6:
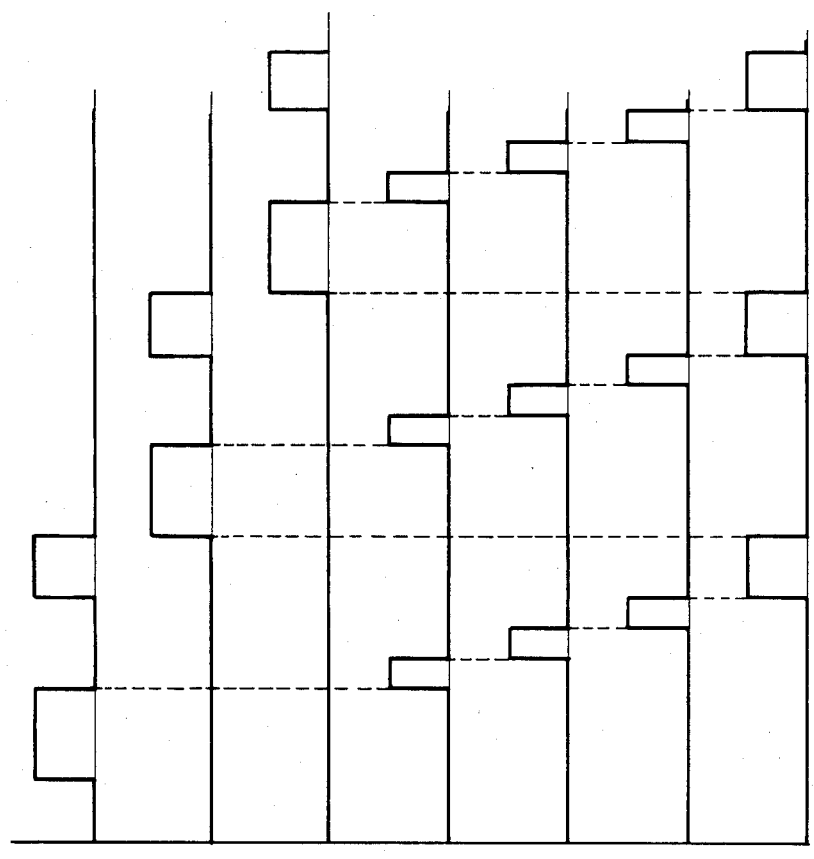
FIG. 6 shows a timing chart for explaining the operation of the third embodiment.

Then, a high level output is delivered from the first parallel output terminal of the shift register 106 to render the switching transistors T1 to T3 conductive [chart (a) of FIG. 6].

As the switching transistors T1 to T3 are rendered conductive, the electrical charges stored in the capacitors C1 to C3 are transferred to the respective capacitors C10 to C12. Thereafter, the shift register 107 shifts to sequentially render the switching transistors T10 to T12 conductive [charts (d) to (f) of FIG. 3].

Accordingly, the first block light information transferred and stored in the capacitors C10 to C12 is sequentially read out.

After information with respect to the first block is read out, a high level output is applied to the terminal 108 so that the switching transistors CT1 to CT3 are simultaneously made conductive [chart (g) of FIG. 6].

Accordingly, the residual electric charges in the capacitors C1 to C3 and C10 to C12 are fully discharged to wait for the next light information storing.

Succeedingly, the shift register 106 shifts again to deliver a high level output signal from the second parallel output terminal, thereby making the switching transistors T4 to T6 conductive [chart (b) of FIG. 6]. The readout of information with respect to the second block is then performed in the similar manner to the first block. The readout for the third block is also performed in the similar manner.

As seen from the above, the information stored in the capacitors C1 to C9 is sequentially read out at the shift timings of the shift registers 106 and 107 and at the application timings of the high level signals for the terminal 108, as shown in FIG. 6.

In this case, the information stored in the capacitors C1 to C9 is transferred, at the same time collectively for each block, to the capacitors C10 to C12. The information transferred and stored in the capacitors C10 to C12 is read out sequentially in time series manner by the switching transistors T10 to T12, respectively.

In a conventional apparatus, transference and discharge have been performed nine times for each capacitor C1 to C9. However, according to the present embodiment, the number of transferences and discharges is only three, thereby enabling to shorten the overall readout time.

In the above embodiment, although the nine light sensors have been divided into three blocks, it is not intended to be limited thereto. It is apparent from the above embodiment that any number of light sensors can be divided into a desired number of blocks.

Figure 7:
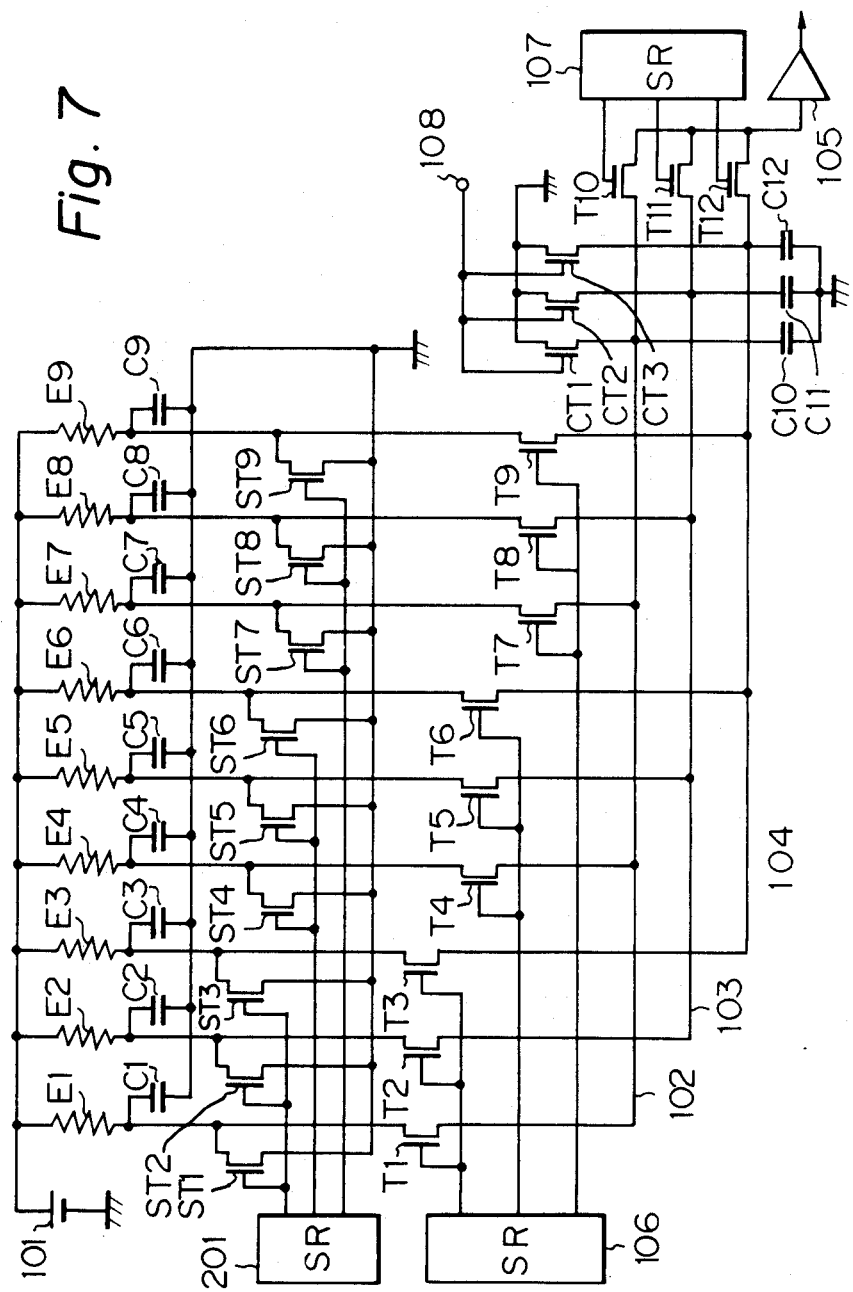
FIG. 7 is a circuit diagram of an image readout apparatus according to a fourth embodiment of the present invention.

FIG. 7 is a circuit diagram illustrating a fourth embodiment of the image readout apparatus according to the present invention.

In this embodiment, the arrangements of light sensors E1 to E9, capacitors C1 to C9, switching transistors T1 to T12 and shift registers 106 and 107 and like others are identical to those in the prior art shown in FIG. 1, therefore the description therefor is omitted.

In FIG. 7, the separate electrodes of the light sensors E1 to E9 are grounded via respective switching transistors ST1 to ST9. Specifically, each of the switching transistors ST1 to ST9 is correspondingly connected in parallel relation to each of the capacitors C1 to C9.

Similarly to the gate electrodes of the switching transistors T1 to T9, the gate electrodes of the switching transistors T1 to T9 are connected in common collectively for each block and the commonly connected gate electrodes for each block are connected to the corresponding parallel output terminal of a shift register 201. Therefore, the switching transistors ST1 to ST9 for each block are rendered conductive at the shift timings of the shift register 201. Also in FIG. 7, the common lines 102 to 104 are grounded via respective capacitors C10 to C12 and also grounded via switching transistors CT1 to CT3. Capacitance of each of the capacitors C10 to C12 is determined sufficiently larger than that of each of the capacitors C1 to C9.

The gate electrodes of the switching transistors CT1 to CT3 are connected in common to the terminal 108. Thus, upon application of a high level signal to the terminal 108, all of the switching transistors CT1 to CT3 are made conductive at the same time and the common lines 102 to 104 are grounded.

Figure 8:
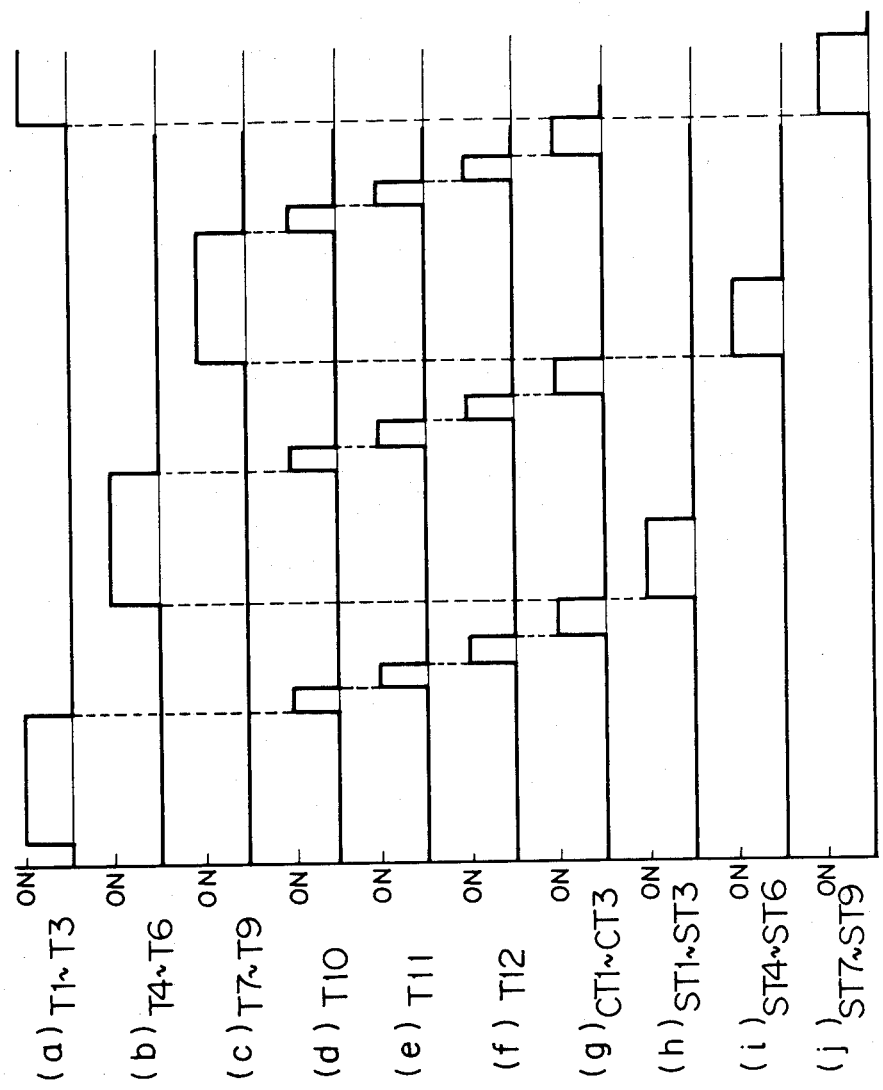
FIG. 8 shows a timing chart for explaining the operation of the fourth embodiment.

Next, the operation of this embodiment constructed as above will be explained in relation to the timing chart of the switching transistors T1 to T12, CT1 to CT3 and ST1 to ST9, as shown in FIG. 8. In the timing chart, an on-state timing of each switching transistor is shown. It is here noted that such on-state timing is also applicable to the high level signal outputted from the shift registers 106, 107 and 201.

First, as the light sensors E1 to E9 receive light rays, electric charges corresponding in amount to the light intensity are stored in the capacitors C1 to C9 from the power source 101.

Then, a high level output is delivered from the first parallel output terminal of the shift register 106 to render the switching transistors T1 to T3 conductive [chart (a) of FIG. 8].

As the switching transistors T1 to T3 are rendered conductive, the electric charges stored in the capacitors C1 to C3 are transferred to the respective capacitors C10 to C12. Thereafter, the shift register 107 shifts with high level outputs to sequentially render the switching transistors T10 to T12 conductive [chart (d) to (f) of FIG. 8]. Accordingly, the first block light information transferred and stored in the capacitors C10 to C12 is sequentially read out through the amplifier 105.

After information with respect to the first block is read out, a high level signal is applied to the terminal 108 so that the switching transistors CT1 to CT3 are simultaneously made conductive [chart (g) of FIG. 8].

Accordingly, the residual electric charges in the capacitors C10 to C12 are fully discharged. After the residual electric charges in the capacitors C10 to C12 are fully discharged, the shift register 106 shifts again to deliver a high level output signal from its second parallel output terminal, thereby making the switching transistors T4 to T6 conductive [chart (b) of FIG. 8]. Thus, the electric charges stored in the second block capacitors C4 to C6 are transferred to the capacitors C10 to C12.

At the same time, a high level output from the first parallel output terminal of the shift register 201 is delivered to make the switching transistors ST1 to ST3 conductive, thereby fully discharging the residual electric charges in the capacitors C1 to C3 [chart (h) of FIG. 8].

As seen from the above, the discharge operation for the first block capacitors C1 to C3 and the transfererence operation, of the electric charges stored in the second block capacitors C4 to C6, to the capacitors C10 to C12 are both simultaneously performed.

Similarly to the case of the first block, upon shifting of the shift register 107 the switching transistors T10 to T12 are sequentially made conductive. Thus, the second block light information stored in the capacitors C10 to C12 is sequentially read out [charts (d) to (f) of FIG. 8].

In the case of the third block, along with the transference operation [chart (c) of FIG. 8], the discharge operation for the second block capacitors C4 to C6 is similarly performed [chart (i) of FIG. 8]. Similar operations described above are repeated for every block.

As appreciated from the above, the transference of the information stored in the capacitors C1 to C9 is carried out for each block. Therefore, although in a conventional apparatus transference and discharge have been performed nine times for each capacitor, the number of transferences and discharges is reduced to only three in the present embodiment. Therefore, it is possible to shorten the overall readout time.

Furthermore, simultaneously with the transference of information of one block to the capacitors C10 to C12, the capacitors of the preceding block, of which the readout is already finished, can be discharged, thereby enabling to further shorten the overall operation time.

In the above embodiment, although the nine light sensors have been divided into three blocks, it is not intended to be limited thereto. It is apparent from the above embodiment that any number of light sensors can be divided into a desired number of blocks.

Figures 9, 9A:
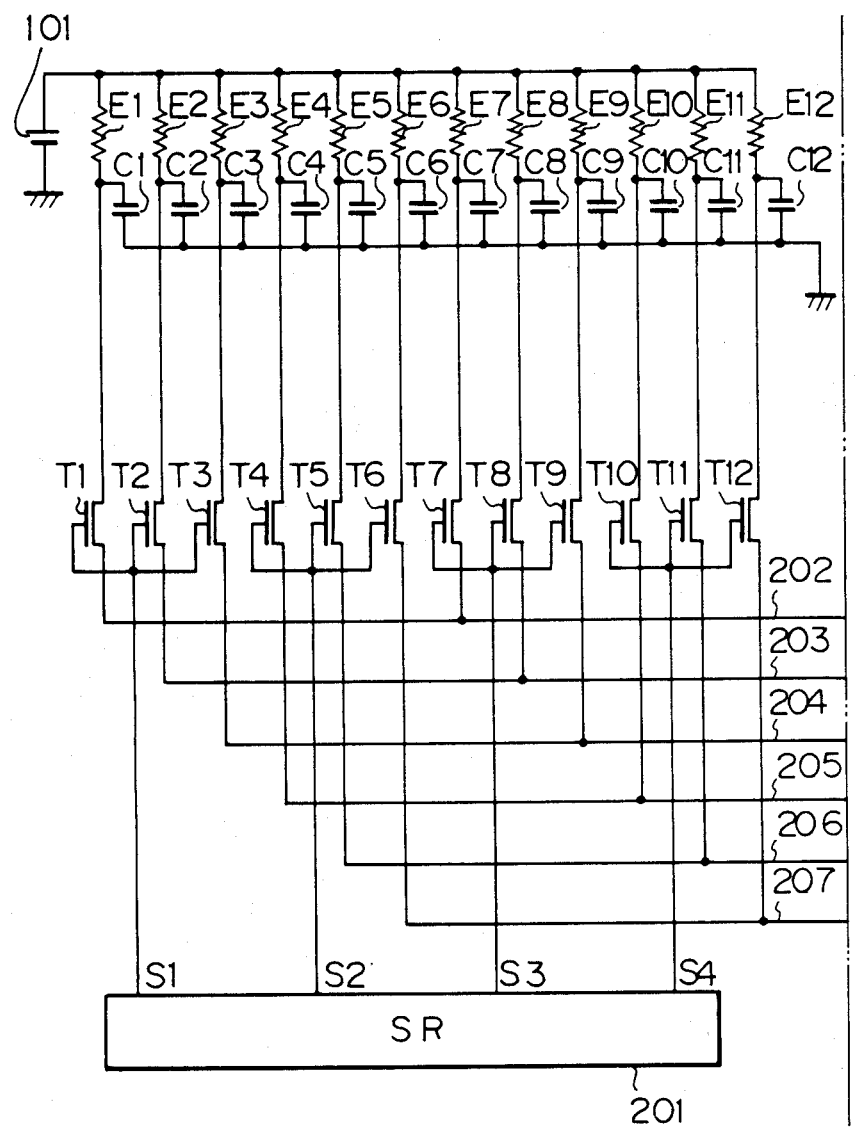
FIGS. 9a and 9b are a circuit diagram of an image readout apparatus according to a fifth embodiment of the present invention.
Figure 9B:
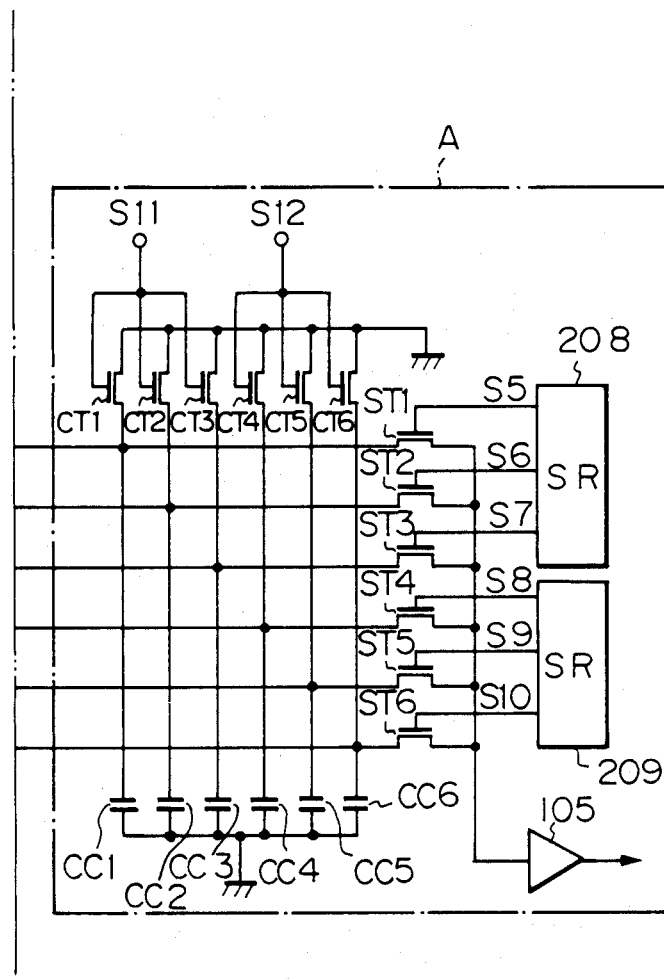

FIG. 9 is a circuit diagram illustrating a fifth embodiment of the image readout apparatus according to the present invention, wherein a light sensor array including twelve light sensors is used.

In the figure, three out of twelve light sensors E1 to E12 constitute one block, while two blocks constitute one group, as will be later described. For example, the first block is made of the light sensors E1 to E3, the second block is made of the light sensors E4 to E6, and the first group is made of the light sensors E1 to E6. Such hierarchic arrangement is also the case in photoelectric charge storing capacitors C1 to C12 and switching transistors T1 to T12, respectively connected to the corresponding light sensors E1 to E12.

One electrode (common electrode) of each of the light sensors E1 to E12 is connected to a power source 101 to which a constant voltage supplied. The other electrode (separate electrode) of each of the light sensors E1 to E12 is connected to one of the main electrodes of each of the switching transistors T1 to T12, and also connected to ground via the corresponding capacitor C1 to C12, respectively.

The gate electrodes of the switching transistors T1 to T12 are connected in common collectively for each block, i.e., three electrodes, and respective commonly connected gate electrodes are connected to the parallel output terminals S1 to S4 of a shift register 201. High level signals are sequentially outputted from the parallel output terminals S1 to S4 of the shift register 201 at predetermined timings, so that the switching electrodes, and the respective commonly connected electrodes are connected to terminals S11 and S12. Therefore, as a high level signal is applied to the terminal S11 or S12, the switching transistors CT1 to CT3 or CT4 to CT6 are made conductive, so that the common lines 202 to 204 or 205 to 207 are grounded.

The operation of this embodiment constructed as above will be explained with reference to the timing chart shown in FIG. 10.

First, as the light sensors E1 to E12 receive light rays, electric charges corresponding in amount to the light intensity are stored in the capacitors C1 to C12 from the power source 101. Then, a high level output is delivered from the parallel output terminal S1 of the shift register 201 to render the switching transistors T1 to T3 conductive [chart (a) of FIG. 10].

As the switching transistors T1 to T3 are rendered conductive, the electric charges stored in the capacitors C1 to C3 are transferred to the capacitors CC1 to CC3 respectively.

Figure 10:
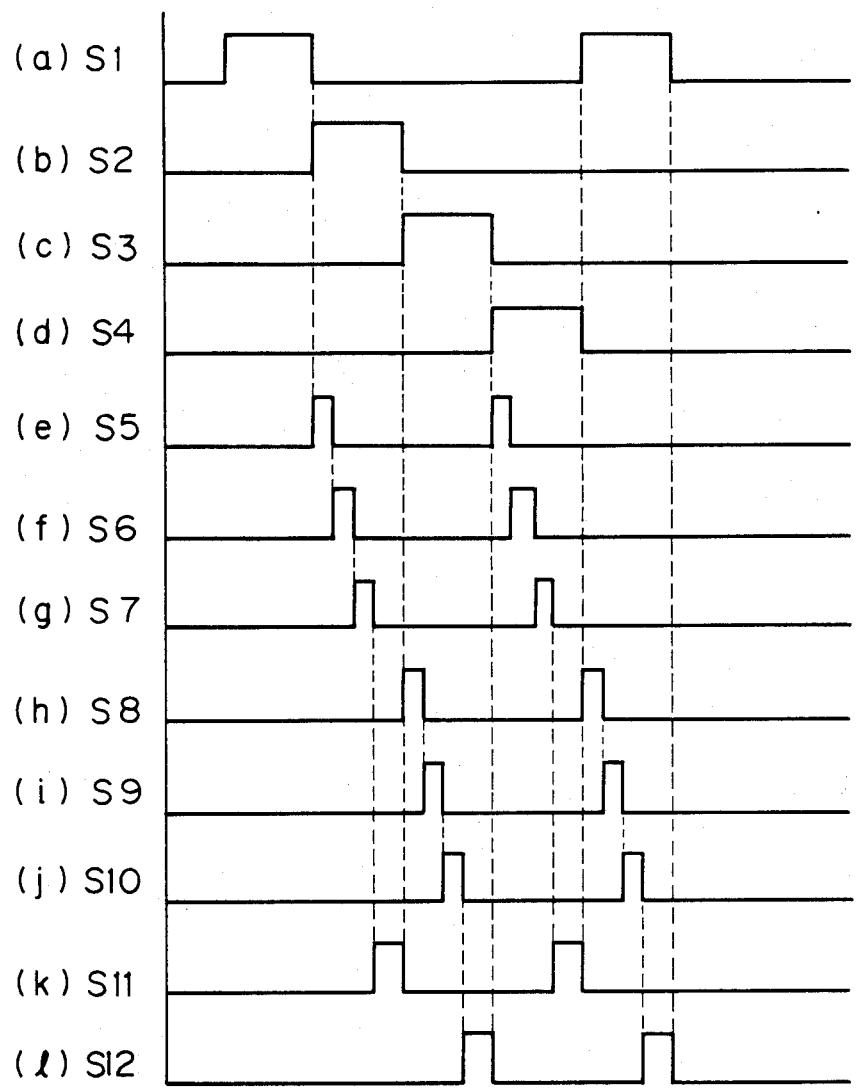
FIG. 10 shows a timing chart for explaining the operation of the fifth embodiment.

After transference of the first block information, a high level signal is then outputted from the output terminal S2 of the shift register 201 to thereby render the switching transistors T4 to T6 conductive [chart (b) of FIG. 10]. Accordingly, the electric charges stored in the second block capacitors C4 to C6 are transferred to the capacitors CC4 to CC6 respectively.

Simultaneously with the transference operation for the second block, high level signals are sequentially outputted from the output terminals S5 to S7 of the shift register 208 [chart (e) to (g) of FIG. 10].

Thus, the switching transistors ST1 to ST3 are sequentially rendered conductive so that the first block light information transferred and stored in the capacitors CC1 to CC3 are read out sequentially in time series manner through the amplifier 105.

After completion of the readout of the first block information, a high level signal is applied to the terminal S11. Therefore, the switching transistors CT1 to CT3 are simultaneously rendered conductive [chart (k) of FIG. 10].

Then, the residual electric charges in the capacitors CC1 to CC3 are fully discharged.

When the residual electric charges are fully discharged from the capacitors CC1 to CC3, respectively, the shift register 201 shifts to deliver a high level signal from its parallel output terminal S3 [chart (c) of FIG. 10]. Therefore, the switching transistors T7 to T9 are rendered conductive so that the electric charges stored in the third block capacitors C7 to C9 are respectively transferred to the capacitors CC1 to CC3.

Simultaneously with the transference operation transistors T1 to T12 are sequentially rendered conductive with respect to each block.

The other main electrodes of the switching transistors T1 to T12, having the same order in position in each group, are respectively connected to common lines 202 to 207. For instance, the electrodes of the second order switching transistors T2 and T8 in each group are connected to the common line 203. The common lines 202 to 207 are connected to the amplifier 105 via respective switching transistors ST1 to ST6.

The gate electrodes of the switching transistors ST1 to ST3 and ST4 to ST6 are respectively connected to the corresponding parallel output terminals S5 to S10 of shift registers 208 and 209. High level output signals are sequentially delivered at predetermined timings from the respective parallel output terminals of the shift registers, so that the switching transistors ST1 to ST6 are sequentially rendered conductive.

The common lines 202 to 207 are grounded via the respective transfer charge storing capacitors CC1 to CC6 and via the discharge switching transistors CT1 to CT6. Capacitance of each of the capacitors CC1 to CC6 is determined sufficiently larger than that of the corresponding capacitors C1 to C12.

The gate electrodes of the switching transistors CT1 to CT6 are connected in common for respective three for the third block information, high level signals are sequentially outputted from the parallel output terminals S8 to S10 of the shift register 209 [charts (h) to (j) of FIG. 10].

Then, the switching transistors ST4 to ST6 are sequentially rendered conductive so that the second block information transferred and stored in the capacitors CC4 to CC6 are read out sequentially in time series manner.

After the readout of the second block information, a high level signal is applied to the terminal S12 to thereby simultaneously make the switching transistors CT4 to CT6 conductive [chart (l) of FIG. 10]. Thus, the residual electric charges stored in the capacitors CC4 to CC6 are fully discharged.

In the similar manner as above, simultaneously with the readout and discharge operations [charts (e) to (g) and (k) of FIG. 10] with respect to the third block information stored in the capacitors CC1 to CC3, the electric charges of the fourth block capacitors C10 to C12 are transferred to the capacitors CC4 to CC6 [chart (d) of FIG. 10].

As a result, the fourth block information stored in the capacitors CC4 to CC6 is read out during the transference of the first block information in the capacitors CC1 to CC3. The similar operations described heretofore are repeated to read out light information sequentially in time series manner.

As appreciated from the above, the transference of information stored in the capacitors C1 to C12 is carried out for each block. Therefore, although in a conventional apparatus transference and discharge have been performed twelve times for each capacitor, the number of transferences and discharges is reduced to only four in the present embodiment. Therefore, it is possible to shorten the overall readout time.

Furthermore, simultaneously with the transference of information of one block, the readout of information and the discharge of residual electric charges with respect to the preceding block can be performed, thereby enabling to further shorten the overall operation time.

In the above embodiment, although the twelve light sensors have been divided into four blocks, it is not intended to be limited thereto. It is apparent from the above embodiment that any number of light sensors can be divided into a desired number of blocks.

Figures 11, 11A:
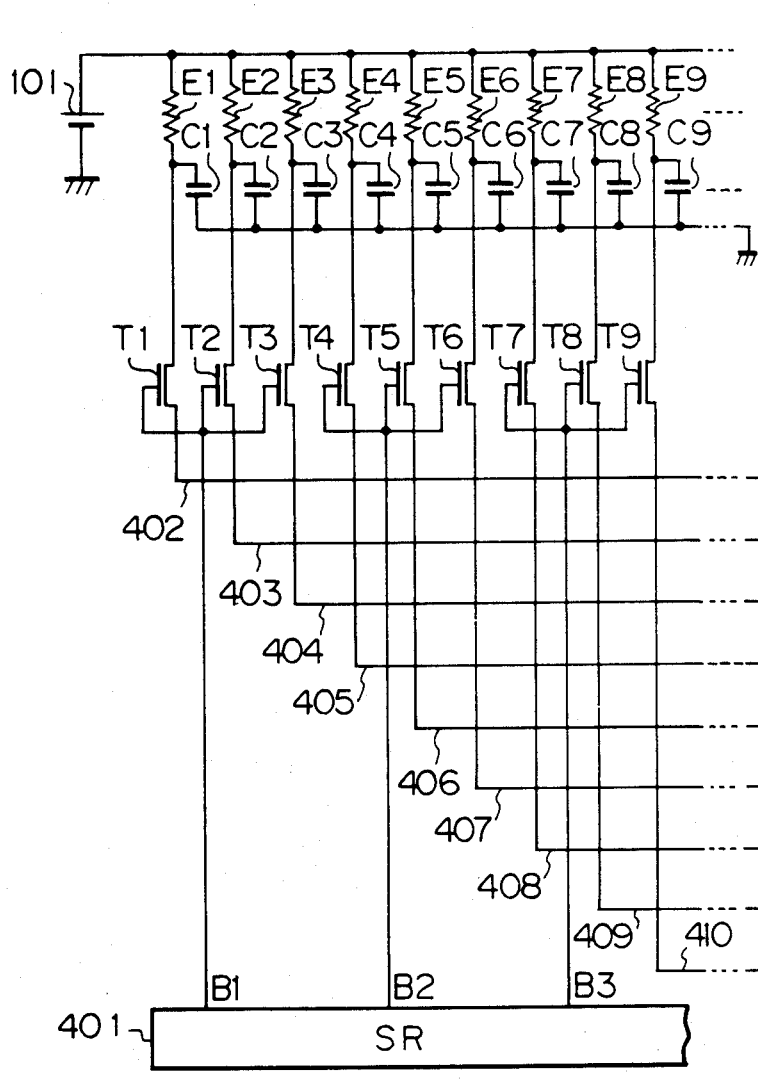
FIGS. 11a and 11b are a circuit diagram of an image readout apparatus according to a sixth embodiment of the present invention.
Figure 11B:
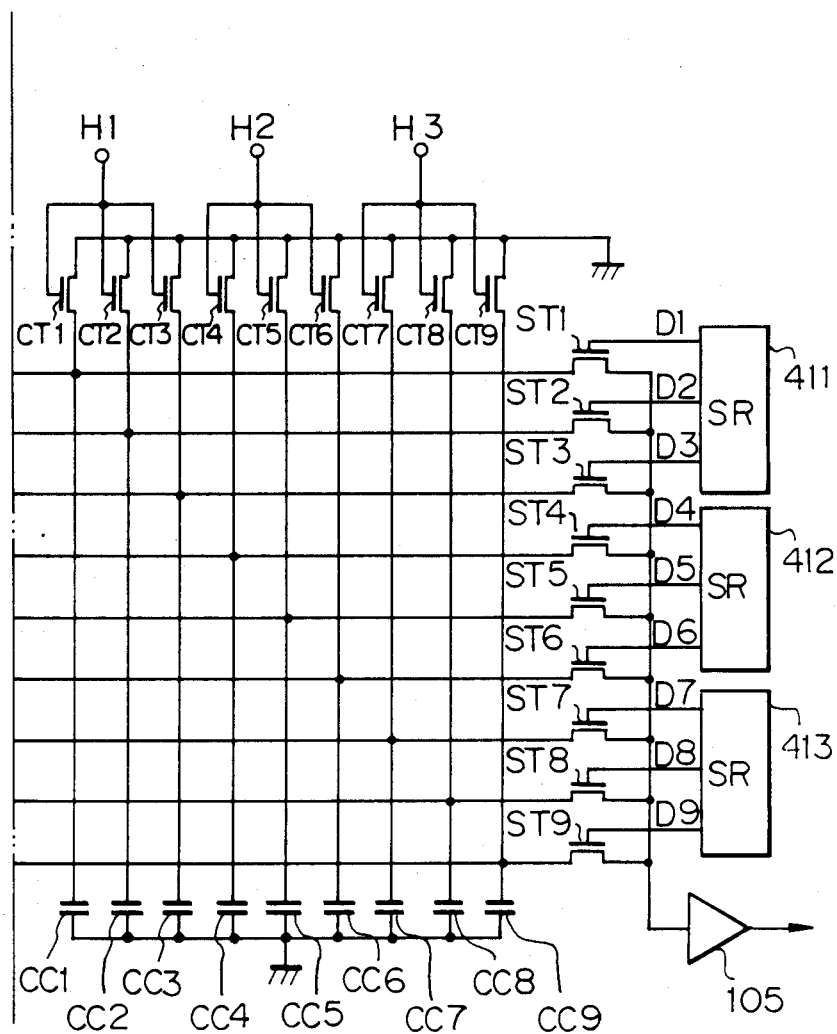

FIG. 11 is a circuit diagram illustrating a sixth embodiment according to the present invention. In the figure, of light sensors E1 to E18, photoelectric charge storing capacitors C1 to C18 and switching transistors T1 to T18, the light sensors E10 to E18, capacitors C10 to C18 and switching transistors T10 to T18 are not depicted.

In FIG. 11, the arrangements of the light sensors E1 to E18, photoelectric charge storing capacitors C1 to C18 and switching transistors T1 to T18 are substantially the same as those in FIG. 1, thus omitting the description therefor. In this embodiment, however, three blocks constitute one group wherein the main electrodes of the switching transistors, having the same order in position in each group, are respectively connected to common lines 402 to 410.

The gate electrodes of the switching transistors T1 to T18 are connected in common for each block, and the respective commonly connected gate electrodes are connected to the corresponding parallel output terminals B1 to B6 of a shift register 401.

The common lines 402 to 410 are grounded via transfer charge storing capacitors CC1 to CC9 and also grounded via discharge switching transistors CT1 to CT9. The gate electrodes of the discharge switching transistors CT1 to CT9 are connected in common for respective three electrodes, and the respective commonly connected gate electrodes are connected to corresponding terminals H1 to H3. The common lies 402 to 410 are connected to the amplifier 105 via switching transistors ST1 to ST9, while the gate electrodes of the switching transistors ST1 to ST9 are respectively connected to the parallel output terminals D1 to D9 of shift registers 411 to 413.

Next, the operation of the embodiment constructed as above will be explained briefly with reference to the timing chart shown in FIG. 12.

Figure 12:
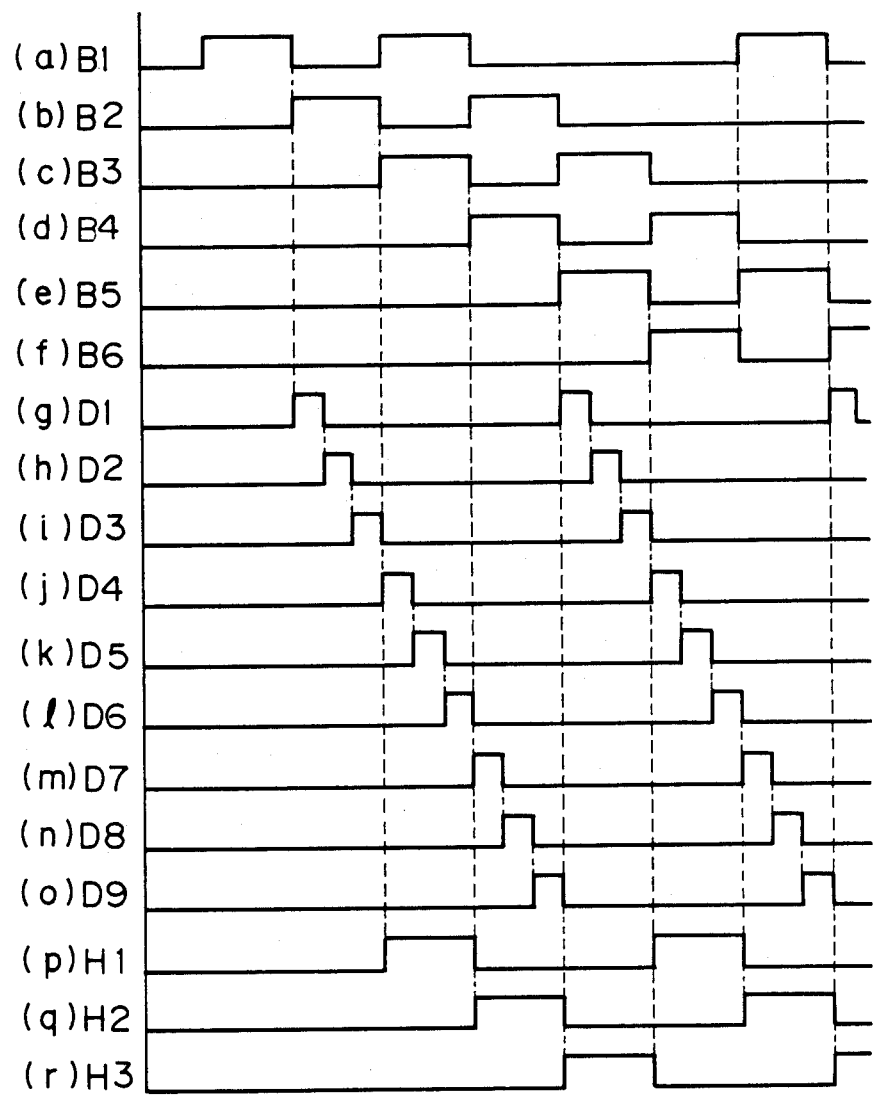
FIG. 12 shows a timing chart for explaining the operation of the sixth embodiment.

First, a high level output is delivered from the output terminal B1 of the shift register 401 to render the switching transistors T1 to T3 conductive [chart (a) of FIG. 12].

As the switching transistors T1 to T3 are rendered conductive, the electric charges stored in the first block capacitors C1 to C3 are transferred to the capacitors CC1 to CC3 respectively.

After transference of the first block information, a high level signal is then outputted from the output terminal B2 of the shift register 401 to thereby render the switching transistors T4 to T6 conductive [chart (b) of FIG. 12]. Accordingly, the electric charges stored in the second block capacitors C4 to C6 are transferred to the capacitors CC4 to CC6 respectively.

Simultaneously with the above transference of the second block information, high level signals are sequentially outputted from the output terminals D1 to D3 of the shift register 411 [chart (g) to (i) of FIG. 12]. Thus, the switching transistors ST1 to ST3 are sequentially rendered conductive so that the first block light information transferred and stored in the capacitors CC1 to CC3 is read out sequentially in time series manner through the amplifier 105.

Furthermore, after the readout operation for the first block, a high level signal is applied to the terminal H1 so that the switching transistors CT1 to CT3 are rendered conductive at the same time [chart (p) of FIG. 12]. Thus, the residual electric charges in the capacitors CC1 to CC3 are discharged.

Simultaneously with the discharge operation, a high level signal is outputted from the output terminal B3 of the shift register 401 [chart (c) of FIG. 12]. Accordingly, the switching transistors T7 to T9 are rendered conductive, and the electric charges stored in the third block capacitors C7 to C9 are transferred to the capacitors CC7 to CC9.

Simultaneously with the above discharge and transference operations, high level signals are sequentially outputted from the output terminals D4 to D6 of the shift register 412 [charts (j) to (l) of FIG. 12], so that the switching transistors ST4 to ST6 are sequentially rendered conductive and the second block information is read out sequentially in time series manner.

Succeedingly, the transference of the fourth block information [chart (d) of FIG. 12], the timeseries readout of the third block information [charts (m) to (o) of FIG. 12], and the discharge operation for the transfer charge storing capacitors CC4 to CC6 [chart (q) of FIG. 12], all are simultaneously performed. Thereafter, the similar operations are repeated to read out light information from the light sensors E1 to E18.

As seen from the above embodiment, by virtue of the arrangement that three blocks constitute one group, the transference operation of one block information, the readout operation for the preceding block, and the discharge operation for residual electric charges with respect to the further one more preceding block can simultaneously be performed, thereby enabling a high speed operation.

Furthermore, it is possible to have a sufficient discharge time for each of the capacitors C1 to C18 and CC1 to CC6.

Figure 13:
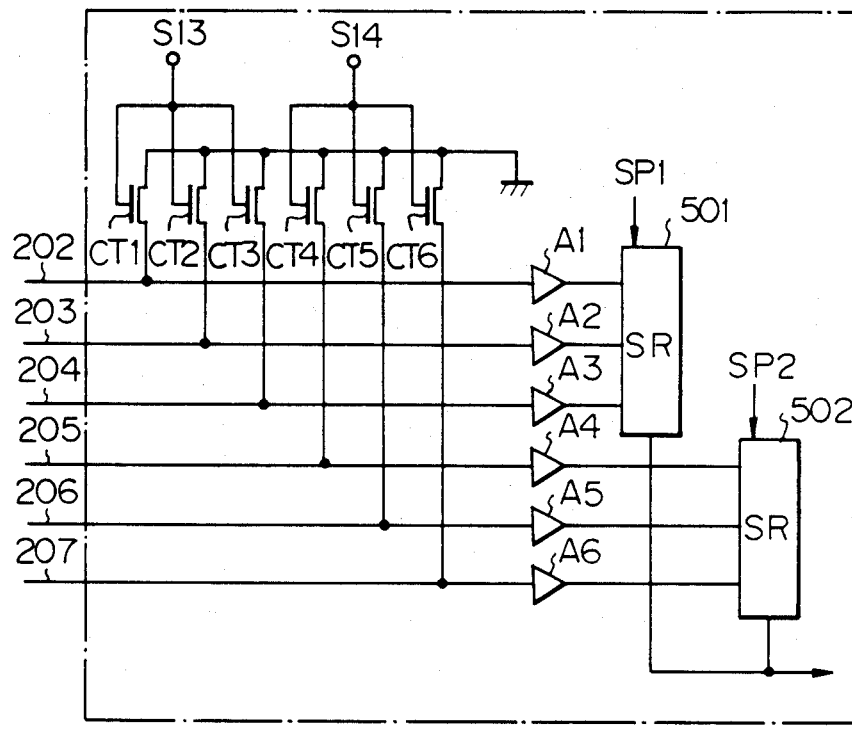
FIG. 13 is a circuit diagram of an image readout apparatus according to a seventh embodiment of the present invention.

Referring now to a seventh embodiment illustrated in FIG. 13, the common lines 202 to 207 are grounded via the respective switching transistors CT1 to CT6 of which the gate electrodes are connected in common for respective three electrodes for connection to respective terminals S13 and S14. The common lines 202 to 204 are also connected via respective amplifiers A1 to A3 to the parallel input terminals of a shift register 501, while the common lines 205 to 207 are connected via respective amplifiers A4 to A6 to the parallel input terminals of a shift register 502.

The shift registers 501 and 502 serially output the stored contents upon reception of shift pulses SP1 and SP2, respectively. The serial output terminals of both registers are connected in common.

The operation of the embodiment constructed as above will be explained briefly in conjunction with the timing chart shown in FIG. 14.

Figure 14:
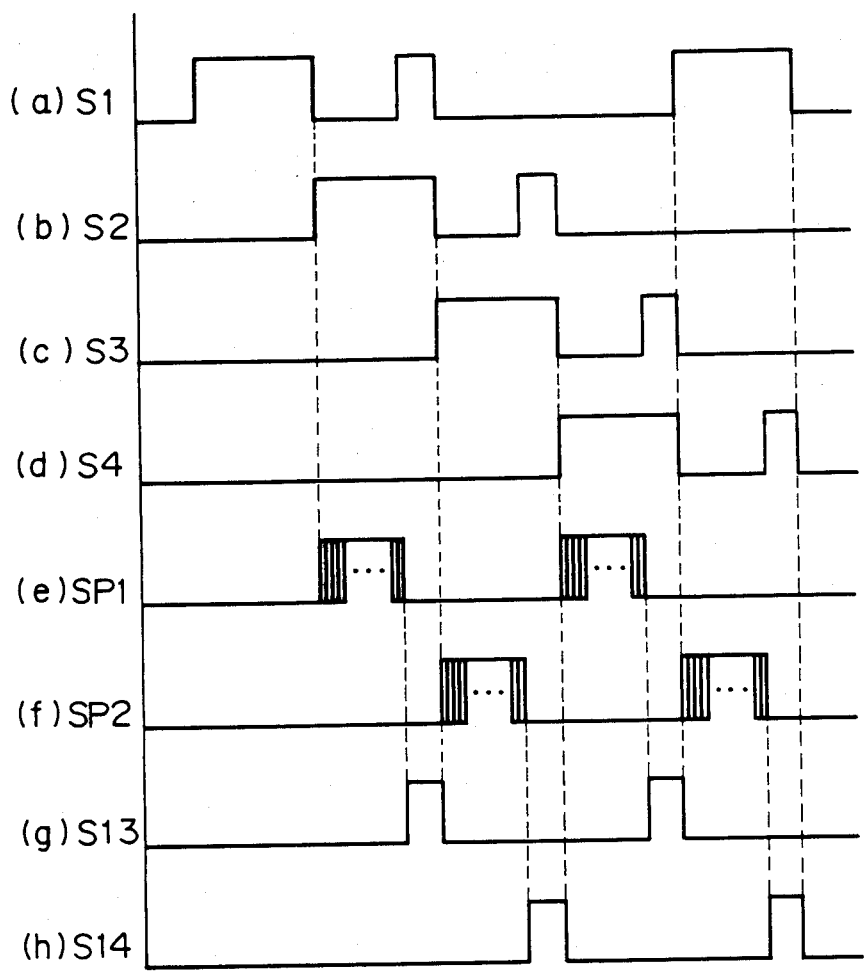
FIG. 14 shows a timing chart for explaining the operation of the seventh embodiment.

First, as a high level signal is outputted from the parallel output terminal S1 of the shift register 201, the switching transistors T1 to T3 are rendered conductive [chart (a) of FIG. 14]. Then, the light information stored in the first block capacitors C1 to C3 is inputted in parallel relation with each other to the shift register 501 through the amplifiers A1 to A3 respectively.

Succeedingly, as the shift register 201 shifts, a high level signal is outputted from its output terminal S2, to thereby render the switching transistors T4 to T6 conductive [chart (b) of FIG. 14]. The light information stored in the second block capacitors C4 to C6 is accordingly inputted in parallel to the shift register 502 through the amplifiers A4 to A6 respectively.

Simultaneously with the transference operation to the shift register 502, a shift pulse SP1 is applied to the shift register 501 [chart (e) of FIG. 14], so that the contents of the shift register 501, i.e., the first block information, is outputted sequentially in time series manner. Thereafter, a high level signal is applied to the terminal S13 [chart (g) of FIG. 14], and the first block capacitors C1 to C3 are fully discharged.

Succeedingly, the third block information is inputted to the shift register 501 [chart (c) of FIG. 14]. Simultaneously therewith, a shift pulse SP2 is inputted to the shift register 502 [chart (f) of FIG. 14], so that the contents of the shift register 502, i.e., the second block information, is outputted sequentially in time series manner. Thereafter, a high level signal is applied to the terminal S14 [chart (h) of FIG. 14], and the second block capacitors C4 to C6 are fully discharged.

The similar operations are repeated to sequentially and repeatedly read out light information from the light sensors E1 to E12.

It is noted that the circuit portion A shown in FIG. 9 may be substituted for the circuit portion A shown in FIG. 13.

Figures 15, 15A:
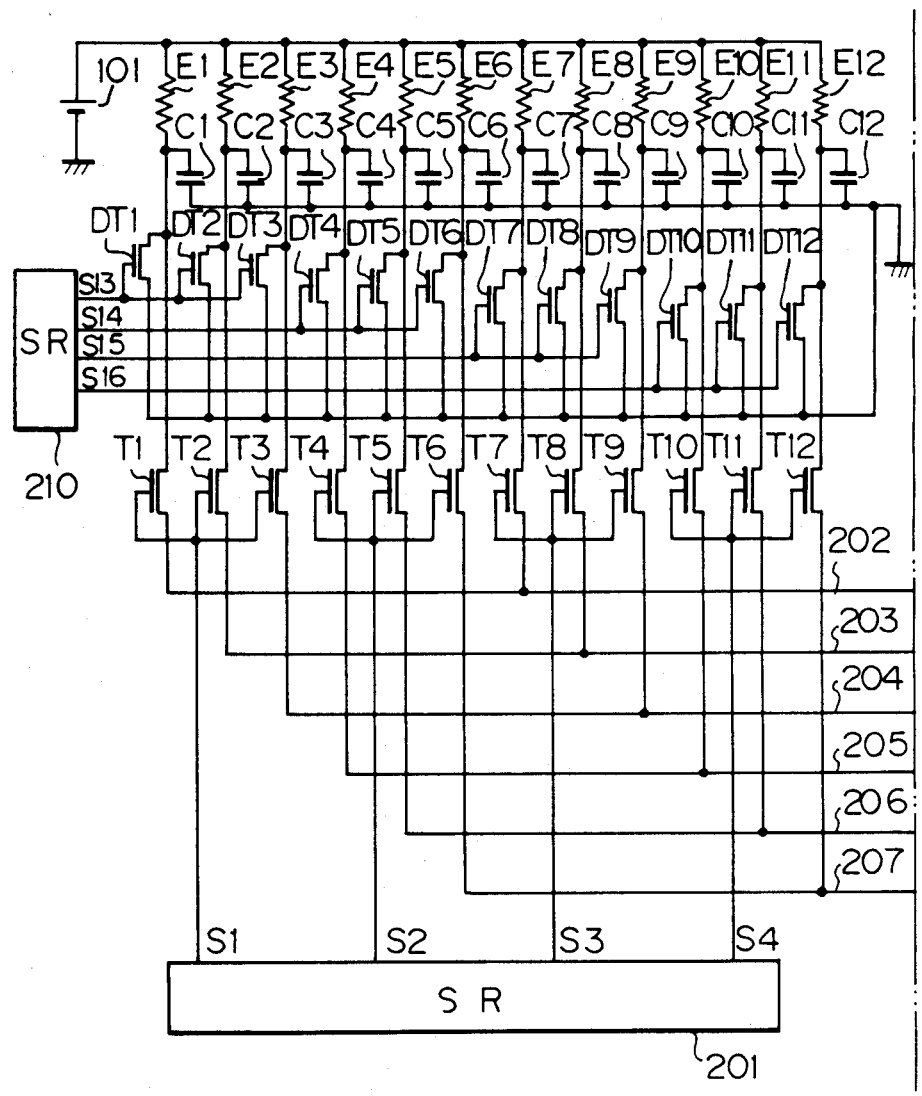
FIGS. 15a and b are a circuit diagram of an image readout apparatus according to an eighth embodiment of the present invention.
Figure 15B:
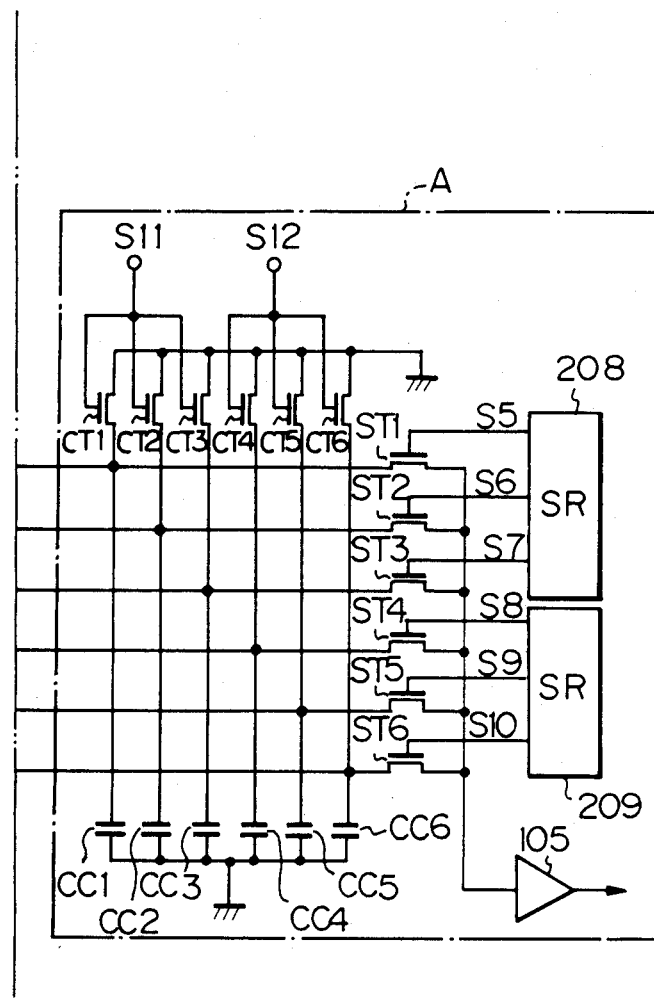

FIG. 15 is a circuit diagram illustrating an eighth embodiment of the image readout apparatus according to the present invention, wherein a light sensor array including twelve light sensors is used.

In the figure, three out of twelve light sensors E1 to E12 constitute one block, while two blocks constitute one group, as will be later described. For example, the first block is made of the light sensors E1 to E3, the second block is made of the light sensors E4 to E6, and the first group is made of the light sensors E1 to E6. Such hierarchic arrangement is also the case in photoelectric charge storing capacitors C1 to C12, discharge switching transistors DT1 to DT12 and switching transistors T1 to T12 respectively connected to the corresponding light sensors E1 to E12.

One electrode (common electrode) of each of the light sensors E1 to E12 is connected to a power source 101 to which a constant voltage supplied. The other electrode (separate electrode) of each of the light sensors E1 to E12 is connected to one of the main electrodes of each of the switching transistors T1 to T12, and is connected to ground via the respective capacitors C1 to C12 and via the respective discharge switching transistors DT1 to DT12.

The gate electrodes of the switching transistors DT1 to DT12 are connected in common for each block, i.e., three electrodes, and the respective commonly connected gate electrodes are connected to the corresponding parallel output terminals S13 to S16 of a shift register 210. High level signals are sequentially outputted from the parallel output terminals S13 to S16 at predetermined timings, so that the switching transistors DT1 to DT12 are sequentially rendered conductive with respect to each block.

The gate electrodes of the switching transistors T1 to T12 are also connected in common for each block, and the respective commonly connected electrodes are connected to the corresponding parallel output terminals S1 to S4 of the shift register 201.

The other main electrodes of the switching transistors T1 to T12, having the same order in position in each group, are respectively connected to common lines 202 to 207. For instance, the electrodes of the second order switching transistors T2 and T8 in respective groups are connected to the common line 203. The common lines 202 to 207 are connected to the amplifier 105 via respective switching transistors ST1 to ST6.

The gate electrodes of the switching transistors ST1 to ST3 and ST4 to ST6 are respectively connected to the corresponding parallel output terminals S5 to S10 of shift registers 208 and 209. High level outputs are sequentially delivered at predetermined timings from the respective parallel output terminals S5 to S10 of the shift registers 208 and 209, so that the switching transistors ST1 to ST6 are sequentially rendered conductive.

The common lines 202 to 207 are grounded via the respective transfer charge storing capacitors CC1 to CC6 and via the discharge switching transistors CT1 to CT6. Capacitance of each of the capacitors CC1 to CC6 is determined sufficiently larger than that of each of the capacitors C1 to C12.

The gate electrodes of the switching transistors CT1 to CT6 are connected in common for respective three electrodes, and the respective commonly connected electrodes are connected to terminals S11 and S12.

Therefore, as a high level signal is applied to the terminal S11 or S12, the switching transistors CT1 to CT3 or CT4 to CT6 are made conductive, so that the common lines 202 to 204 or 205 to 207 are grounded.

The operation of this embodiment constructed as above will be explained with reference to the timing chart shown in FIG. 16.

First, as the light sensors E1 to E12 receive light rays, electric charges corresponding in amount to the light intensity are stored in the capacitors C1 to C12 from the power source 101.

Figure 16:
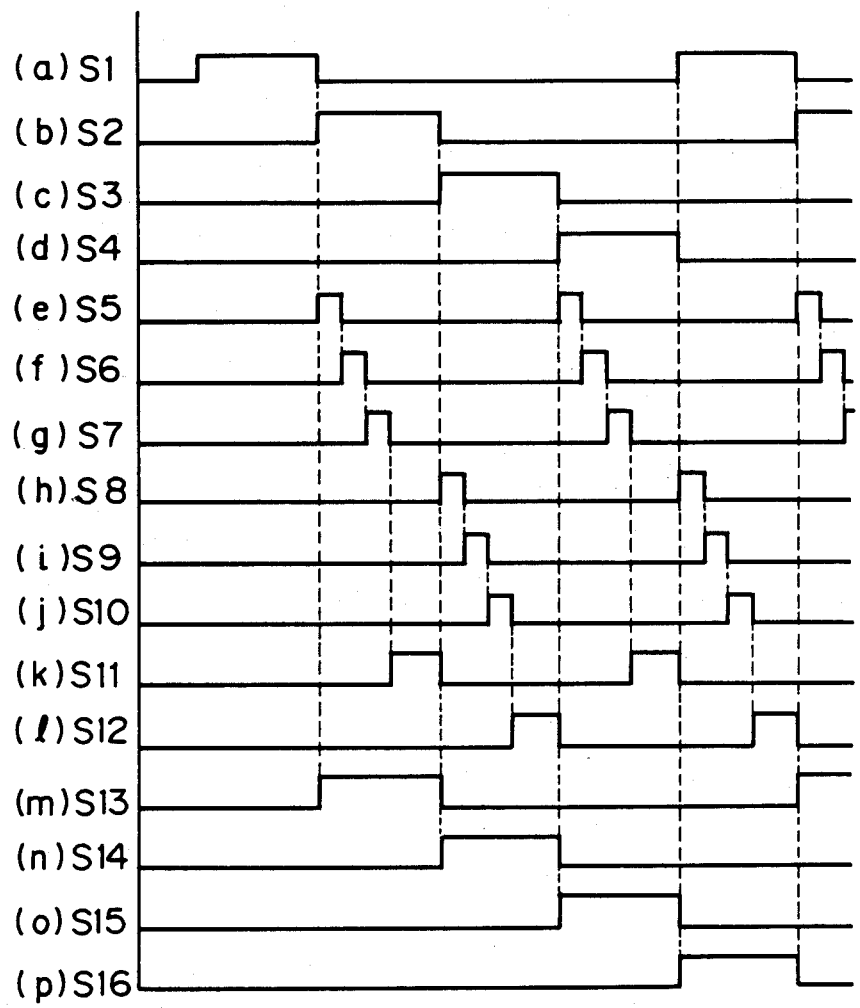
FIG. 16 shows a timing chart for explaining the operation of the eighth embodiment.

Then, a high level output is delivered from the parallel output terminal S1 of the shift register 201 to render the switching transistors T1 to T3 conductive [chart (a) of FIG. 16].

As the switching transistors T1 to T3 are rendered conductive, the electric charges stored in the first block capacitors C1 to C3 are transferred to the capacitors CC1 to CC3 respectively.

After transference of the first block information, a high level signal is then outputted from the output terminal S2 of the shift register 201 to thereby render the switching transistors T4 to T6 conductive [chart (b) of FIG. 16]. Accordingly, the electric charges stored in the second block capacitors C4 to C6 are transferred to the respective capacitors CC4 to CC6.

Simultaneously with the transference operation for the second block, high level signals are sequentially outputted from the output terminals S5 to S7 of the shift register 208 [chart (e) to (g) of FIG. 16]. Thus, the switching transistors ST1 to ST3 are sequentially rendered conductive so that the first block light information transferred and stored in the capacitors CC1 to CC3 are read out sequentially in time series manner through the amplifier 105.

After completion of the readout of the first block information, a high level signal is applied to the terminal S11. Therefore, the switching transistors CT1 to CT3 are simultaneously rendered conductive [chart (k) of FIG. 16].

As a result, the residual electric charges in the capacitors CC1 to CC3 are fully discharged.

Simultaneously with the above readout operation and discharge operation for transferred electric charges [charts (e) to (g) and (k) of FIG. 16], a high level signal is outputted from the parallel output terminal S13 of the shift register 210 [chart (m) of FIG. 16].

The switching transistors DT1 to DT3 are accordingly rendered conductive, so that the residual electric charges in the first block photoelectric charge storing capacitors C1 to C3 are fully discharged.

As seen from the above, the transference of the second block information, the readout of the first block information and discharge of residual transfer charges, and the discharge of photoelectric charges are simultaneously performed.

After the above operations are completed, the shift register 201 shifts to deliver a high level signal from its parallel output terminal S3 [chart (c) of FIG. 16]. Therefore, the switching transistors T7 to T9 are rendered conductive so that the electric charges stored in the third block capacitors C7 to C9 are transferred to the capacitors CC1 to CC3 respectively.

Simultaneously with the transference operation for the third block information, high level signals are sequentially outputted from the parallel output terminals S8 to S10 of the shift register 209 [charts (h) to (j) of FIG. 16].

Then, the switching transistors ST4 to ST6 are sequentially rendered conductive so that the second block information transferred and stored in the capacitors CC4 to CC6 are read out in time series manner.

After the readout of the second block information, a high level signal is applied to the terminal S12 to thereby simultaneously make the switching transistors CT4 to CT6 conductive [chart (l) of FIG. 16]. Thus, the residual electric charges stored in the capacitors CC4 to CC6 are fully discharged.

Simultaneously with the readout operation for the second block information and discharge operation for residual transfer charge, a high level signal is outputted from the parallel output terminal S14 of the shift register 210 [chart (n) of FIG. 16], so that the switching transistors ST4 to ST6 are rendered conductive at the same time. Thus, the residual electric charges in the photoelectric charge storing capacitors C4 to C6 are discharged.

In the similar manner as above, simultaneously with the transference of the fourth block information, the readout of the third block information and the discharge operations for residual transfer charges and residual photoelectric charges are performed. The readout of the fourth block information and the discharge operations for residual transfer charges and residual photoelectric charges are performed simultaneously with the readout of the first block information.

The similar operations described heretofore are repeated to read out light information in time series manner.

As appreciated from the above, the transference of information stored in the capacitors C1 to C12 is carried out for each block. Therefore, although in a conventional apparatus transference and discharge have been performed twelve times for each capacitor, the number of transferences and discharges is reduced to only four in the present embodiment. Therefore, it is possible to shorten the overall readout time.

Furthermore, simultaneously with the transference of information of the block, the readout of the preceding block information and the discharge operations for residual transfer charges and residual photoelectric charges can be performed, thereby enabling to further shorten the overall operation time.

In the above embodiment, although the twelve light sensors have been divided into four blocks, it is not intended to be limited thereto. It is apparent from the above embodiment that any number of light sensors can be divided into a desired number of blocks.

Figure 17:
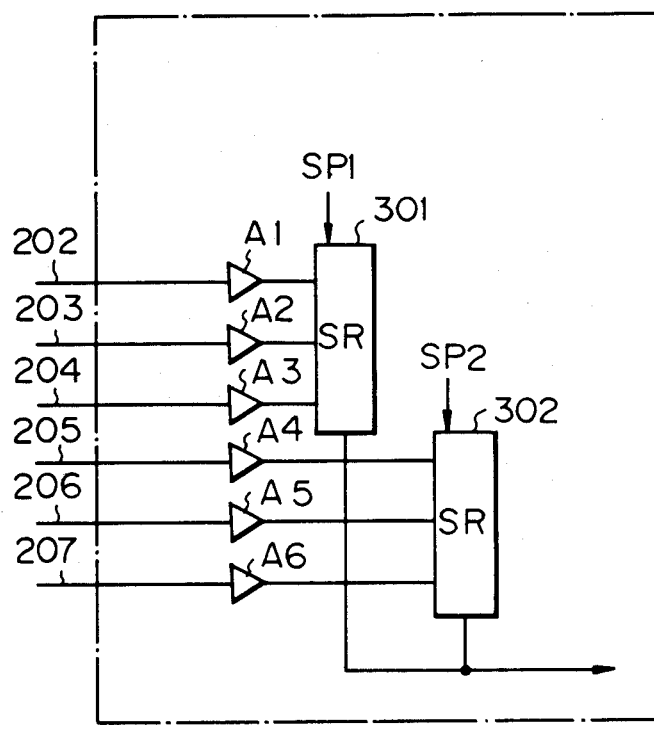
FIG. 17 is a circuit diagram of a part of an image pickup apparatus according to a ninth embodiment of the present invention.

It is noted that the circuit portion A shown in FIG. 15 may be substituted for the circuit portion A shown in FIG. 17.

Referring now to a ninth embodiment illustrated in FIG. 17, the common lines 202 to 204 are respectively connected to the parallel input terminals of the shift register 301 via the respective amplifiers A1 to A3. The common lines 205 to 207 are respectively connected to the parallel input terminals of the shift register 302 via the respective amplifiers A4 to A6.

The shift registers 301 and 302 serially output the stored contents upon reception of shift pulses SP1 and SP2 respectively. The serial output terminals of both registers are connected in common.

The operation of the embodiment constructed as above will be explained briefly in conjunction with the timing chart shown in FIG. 16.

Similarly to the eighth embodiment, as the shift register 201 shifts, the electric charges for each block in the photoelectric charge storing capacitors C1 to C12 are transferred to either the shift register 301 or the shift register 302 [charts (a) to (d) of FIG. 16].

It is here assumed that the first block information is being stored in the shift register 301 [chart (a) of FIG. 16].

Succeedingly, simultaneously with the transference operation of the second block information to the shift register 302 [chart (b) of FIG. 16], a shift pulse SP1 is inputted to the shift register 301 to thereby output in serial the first block information stored in the shift register 301.

Furthermore, simultaneously with the above operations, a high level signal is outputted from the output terminal S13 of shift register 210 [chart (m) of FIG. 16], so that the residual electric charges in the first block capacitors C1 to C3 are discharged.

Similarly to the above, thereafter, during the time when the third block information is transferred to the shift register 301 [chart (c) of FIG. 16], a shift pulse SP2 is applied to the shift register 302, so that the stored second block information is read out serially. Simultaneously therewith, the residual electric charges in the second block capacitors C4 to C6 are discharged.

The similar operations are repeated to sequentially and repeatedly read out light information.

Figure 18A:
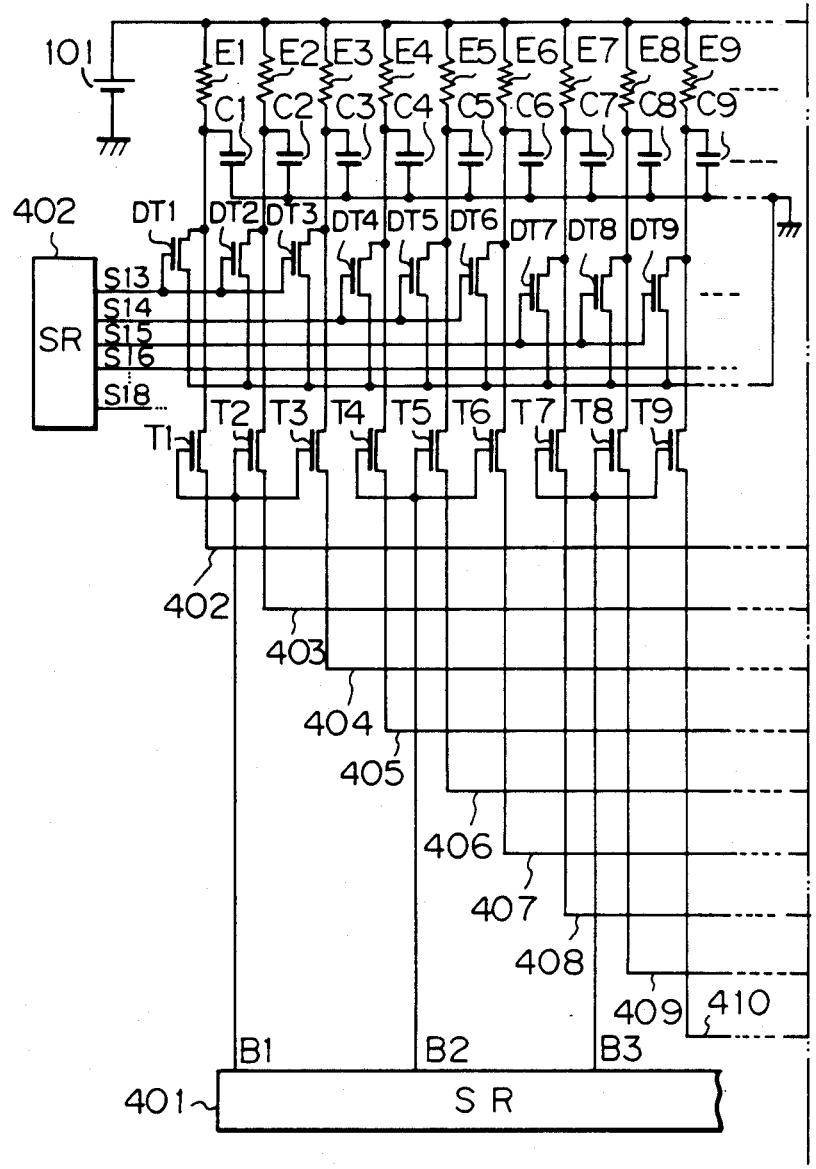
FIGS. 18a and 18b are a circuit diagram of an image readout apparatus according to a tenth embodiment of the present invention.
Figure 18B:
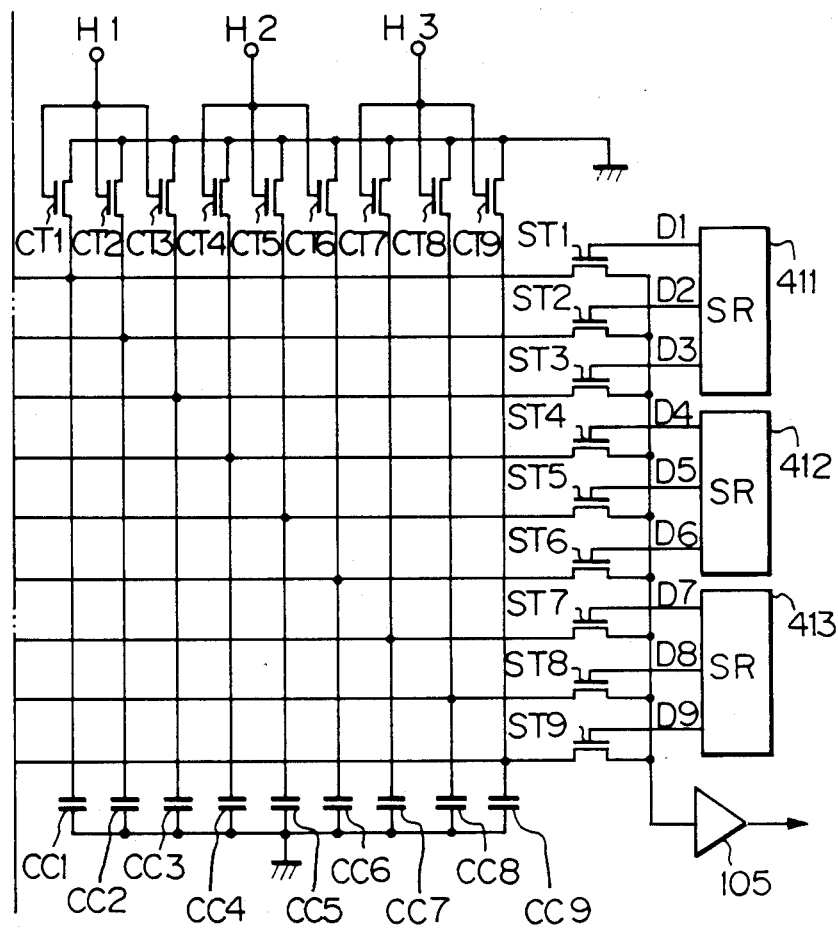

FIG. 18 is a circuit diagram illustrating a tenth embodiment according to the present invention. In the figure, the arrangements of the light sensors E1 to E18, photoelectric charge storing capacitors C1 to C18, discharge switching transistors DT1 to DT18 for photoelectric charges, and switching transistors T1 to T18 are substantially the same as those in FIG. 1, only the number of elements being increased from 12 to 18, thus omitting the description therefor. In FIG. 18, part of the circuit is omitted in view of the drawing space.

In this embodiment, three blocks constitute one group wherein the main electrodes of the switching transistors, having the same order in position in each group, are respectively connected to common lines 402 to 410.

The gate electrodes of the switching transistors T1 to T18 are connected in common for each block, and the respective commonly connected gate electrodes are connected to the corresponding parallel output terminals B1 to B6 of a shift register 401.

The gate electrodes of the switching transistors DT1 to DT18 are connected in the similar manner to the corresponding parallel output terminals S13 to S18 of a shift register 402. The common lines 402 to 410 are grounded via transfer charge storing capacitors CC1 to CC9 and also grounded via discharge switching transistors CT1 to CT9. The gate electrodes of the discharge switching transistors CT1 to CT9 are connected in common for respective three electrodes, and the respective commonly connected electrodes are connected to terminals H1 to H3. The common lines 402 to 410 are connected to the amplifier 105 via switching transistors ST1 to ST9, while the gate electrodes of the switching transistors ST1 to ST9 are respectively connected to the parallel output terminals D1 to D9 of shift registers 411 to 413.

Next, the operation of the embodiment constructed as above will be explained briefly with reference to the timing chart shown in FIG. 19.

Figure 19:
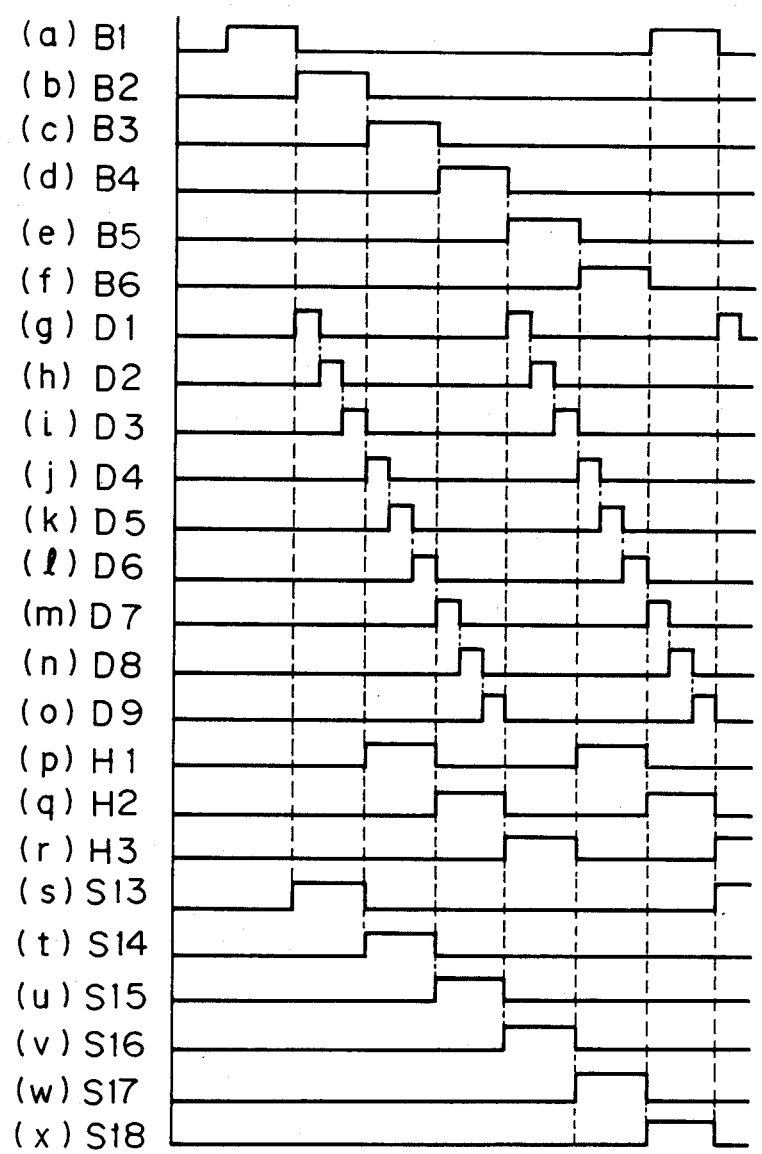
FIG. 19 shows a timing chart for explaining the operation of the tenth embodiment.

First, a high level signal is outputted from the output terminal B1 of the shift register 401 to render the switching transistors T1 to T3 conductive [chart (a) of FIG. 19].

As the switching transistors T1 to T3 are rendered conductive, the electric charges stored in the first block capacitors C1 to C3 are transferred to the respective capacitors CC1 to CC3.

After transference of the first block information, a high level signal is then outputted from the output terminal B2 of the shift register 401 to thereby render the switching transistors T4 to T6 conductive [chart (b) of FIG. 19]. Accordingly, the electric charges stored in the second block capacitors C4 to C6 are transferred to the respective capacitors CC4 to CC6.

Simultaneously with the above transference of the second block information, high level signals are sequentially outputted from the output terminals D1 to D3 of the shift register 411 [chart (g) to (i) of FIG. 19]. Thus, the switching transistors ST1 to ST3 are sequentially rendered conductive so that the first block light information transferred and stored in the capacitors CC1 to CC3 are read out in time series manner through the amplifier 105.

Furthermore, simultaneously with the transference operation of the second block information, a high level signal is outputted from the terminal S13 of the shift register 402 [chart (s) of FIG. 19], so that the switching transistors DT1 to DT3 are rendered conductive. Thus, the residual photoelectric charge in the first block capacitors C1 to C3 are discharged.

Upon completion of the readout of the first block information and the discharge of the residual photoelectric charges, a high level signal is applied to the terminal H1. Therefore, the switching transistors CT1 to CT3 are rendered conductive [chart (p) of FIG. 19] and the residual electric charges in the capacitors CC1 to CC3 are fully discharged.

Simultaneously with the discharge operation, a high level signal is outputted from the terminal B3 of the shift register 401 [chart (c) of FIG. 19]. Therefore, the switching transistors T7 to T9 are rendered conductive so that the electric charges stored in the third block capacitors C7 to C9 are transferred to the capacitors CC7 to CC9.

Simultaneously with the above discharge and transference operations, high level signals are sequentially outputted from the output terminals D4 to D6 of the shift register 412 [charts (j) to (l) of FIG. 19], so that the switching transistors ST4 to ST6 are sequentially rendered conductive and the second block information are read out in time series manner.

Furthermore, simultaneously with the above discharge and transference operations, a high level signal is outputted from the output terminal S14 of the shift register 402 [chart (t) of FIG. 19], so that the residual photoelectric charges in the second block capacitors C4 to C6 are discharged.

Succeedingly, the transference of the fourth block information [chart (d) of FIG. 19], the timeseries readout of the third block information [charts (m) to (o) of FIG. 19], the discharge operation for the transfer charge storing capacitors CC4 to CC6 [chart (q) of FIG. 19], and the discharge operation of the residual photoelectric charges in the capacitors C7 to C9 [chart (u) of FIG. 19], all are simultaneously performed. Thereafter, the similar operations are repeated to read out light information from the light sensors E1 to E18.

As seen from the above embodiment, by virtue of the arrangement that three blocks constitute one group, the transference operation of one block information, the readout operation and the discharge operation for residual electric charges for the preceding block, and the discharge operation for residual electric charges with respect to the further one more preceding block, can simultaneously be performed, thereby enabling a high speed operation.

Furthermore, it is possible to have a sufficient discharge time for each of the capacitors C1 to C18 and CC1 to CC6 since each capacitor can be independently discharged.

As seen from the above detailed description, the image readout apparatus of the present invention comprises discharge switching means correspondingly provided to first storage means for storing photoelectric charges; second storage means for storing information for a plurality of blocks; discharge switching means correspondingly provided to each of said second storage means; and serial output means for deriving information in time series manner from said second storage means.

According to the invention, the provision of second storing means capable of storing information for a plurality of blocks enables to simultaneously perform transference, readout and discharge operation, thereby shortening the overall operation time.

Furthermore, since an enough time is available for operation of the transference, readout and discharge, each operation can be reliably performed to thereby improve the reliability of image readout.

The provision of discharge switching means corresponding to first and second storing means also enables to fully discharge first and second storing means at a high speed, thereby completely avoiding the influence caused by residual electric charges.

Still further, since the information transference from first storing means to second storing means is performed collectively for each block, the time required for the transference can be shortened, whereby the overall operation speed can be further improved.

With the image readout apparatus according to the present invention, for example, in the case where information for two blocks can be stored, simultaneously with the information transference for one block, the readout of information and the discharge of residual electric charges with respect to the preceding block can be performed. In the case where information for three blocks can be stored, simultaneously with the information transference for one block, the information readout for the preceding block and the discharge of residual electric charges for the one more preceding block can be performed.

We claim:

1. An image readout apparatus comprising;
   a plurality of photoelectric conversion elements, divided into a plurality of groups;
   respective storage means provided for each of said photoelectric conversion elements for correspondingly storing an output signal from a respective one of said photoelectric conversion elements;
   readout switching means for sequentially selecting the groups and for simultaneously reading out a signal stored in the ones of said storage means associated with the selected one of said groups;
   switching means for sequentially deriving a signal stored in said storage means; and a plurality of discharge switching means disposed in parallel with said storage means for sequentially selecting the groups and for simultaneously discharging said storage means associated with a selected group, wherein a readout operation of said readout switching means and a discharge operation of said discharge switching means are performed simultaneously.

2. An image readout apparatus according to claim 1, wherein each of said groups comprises a predetermined number of said photoelectric conversion elements.

3. An image readout apparatus comprising:

a plurality of photoelectric conversion elements, divided into a plurality of groups;

first storing means respectively provided for each of said photoelectric conversion elements for correspondingly storing an output signal from a respective one of said photoelectric conversion elements;

first switching means for sequentially selecting the groups and for simultaneously deriving the output signals from a respective one of said first storage means associated with a selected group;

second switching means for deriving in a time series manner the signals of said group selected by said first switching means;

a plurality of first discharge switching means respectively disposed in parallel with each of said first storage means for sequentially selecting the groups and for simultaneously discharging said first storage means;

second storage means for respectively storing the signals of said groups selected by said first switching means; and a plurality of second discharge switching means disposed in parallel relation to each of said second storage means, wherein a deriving operation of said first switching means and a discharge operation of said first discharge switching means are performed simultaneously.

4. An image readout apparatus comprising:

a plurality of photoelectric conversion elements, divided into a plurality of groups;

first storage means respectively provided for each of said plurality of photoelectric conversion elements for correspondingly storing an output signal from said photoelectric conversion element;

first switching means for sequentially selecting the groups and for simultaneously deriving the output signals from a respective one of said first storage means associated with a selected group;

second storage means for respectively storing the signals of said groups selected by said first switching means, said second storage means comprising a parallel-in/serial-out shift register;

a plurality of discharge switching means connected to each of said second storage means for discharging said second storage means; and serial output means for deriving in a time series manner each of the signals, corresponding to said plurality of groups, stored in said second storage means, said serial output means comprising a parallel-in/serial-out shift register.

5. An image readout apparatus comprising:

a plurality of photoelectric conversion elements, divided into a plurality of groups;

first storage means respectively provided for each of said photoelectric conversion elements for correspondingly storing an output signal from said photoelectric conversion element;

first switching means for sequentially selecting the groups and for simultaneously deriving the output signals from a respective one of said first storage means associated with a selected group;

a plurality of first discharge switching means respectively connected to each of said first storage means for discharging said first storage means;

second storage means for respectively storing the signals of said groups selected by said first switching means;

a plurality of second discharge switching means connected to each of said second storage means for discharging said second storage means; and serial output means for deriving in a time series manner each of the signals, corresponding to said plurality of groups, stored in said second storage means.

6. An image readout apparatus according to claim 5 wherein said second storage means is a capacitor and said serial output means is a switching transistor.

7. An image readout apparatus according to claim 5, wherein said serial output means is a parallel-in/serial-out shift register.

* * * * *

UNITED STATES PATENT AND TRADEMARK OFFICE
CERTIFICATE OF CORRECTION

PATENT NO. : 4,827,345

DATED : May 2, 1989

INVENTOR(S) : Katsumi Nakagawa, et al.

It is certified that error appears in the above-identified patent and that said Letters Patent is hereby corrected as shown below:

COLUMN 1:

Line 23, change "E1 to E9(a" to --E1 to E9.--.

Line 24, delete "common electrode)."

Line 25, change "E9 is" to --E9 (a common electrode)--.

COLUMN 3:

Line 12, change "to provide" to --there is provided--.

COLUMN 18:

Line 56, change "comprising;" to --comprising:--.

UNITED STATES PATENT AND TRADEMARK OFFICE
CERTIFICATE OF CORRECTION

PATENT NO. : 4,827,345

DATED : May 2, 1989

INVENTOR(S) : Katsumi Nakagawa, et al.

It is certified that error appears in the above-identified patent and that said Letters Patent is hereby corrected as shown below:

<u>COLUMN 19</u>:

Line 19, change "sponding" to --spondingly--.

<u>COLUMN 20</u>:

Line 1, change "corresponding" to --correspondingly--.

Line 24, change "sponding" to --spondingly--.

Line 43, change "claim 5" to --claim 5,--.

Signed and Sealed this

Twenty-sixth Day of December, 1989

*Attest:*

JEFFREY M. SAMUELS

*Attesting Officer*     *Acting Commissioner of Patents and Trademarks*